(12) United States Patent
Krah et al.

(10) Patent No.: US 8,743,062 B2
(45) Date of Patent: Jun. 3, 2014

(54) NOISE REDUCTION FOR TOUCH CONTROLLER

(75) Inventors: Christoph Horst Krah, Los Altos, CA (US); Ali Motamed, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 12/960,371

(22) Filed: Dec. 3, 2010

(65) Prior Publication Data

US 2012/0139846 A1 Jun. 7, 2012

(51) Int. Cl.
*G06F 3/041* (2006.01)

(52) U.S. Cl.
USPC ........................................ 345/173; 178/18.03

(58) Field of Classification Search
USPC .......... 345/173–178; 178/18.01–18.09, 18.11
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,643,011 B2 | 1/2010 | O'Connor et al. | |
| 7,663,607 B2 | 2/2010 | Hotelling et al. | |
| 8,390,576 B2 * | 3/2013 | Hong et al. .................. 345/173 |
| 8,479,122 B2 | 7/2013 | Hotelling et al. | |
| 2006/0026521 A1 | 2/2006 | Hotelling et al. | |
| 2006/0103635 A1 | 5/2006 | Park | |
| 2006/0146038 A1 | 7/2006 | Park et al. | |
| 2006/0197753 A1 | 9/2006 | Hotelling | |
| 2008/0062139 A1 | 3/2008 | Hotelling et al. | |

(Continued)

FOREIGN PATENT DOCUMENTS

| JP | 2000-163031 A | 6/2000 |
| JP | 2002-342033 A | 11/2002 |
| WO | WO-2009/027629 A1 | 3/2009 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Stephen Sherman
(74) *Attorney, Agent, or Firm* — Morrison & Foerster LLP

(57) ABSTRACT

A touch controller having noise reduction circuitry is disclosed. The touch controller can include a transmit section for generating stimulation signals to drive a touch display to sense a touch or hover event. The touch controller can also include a receive section for processing touch signals from the touch display indicative of the touch or hover event. The touch controller can reduce noise introduced into the stimulation signals and propagated through the touch display into the touch signals, thereby interfering with touch and hover sensing. To reduce the noise, the transmit section's noise reduction circuitry can isolate and subtract some or all of the noise from the stimulation signals. In addition or alternatively, the receive section's noise reduction circuitry can isolate and subtract some or all of the noise from the touch signals.

24 Claims, 16 Drawing Sheets

(56) References Cited

U.S. PATENT DOCUMENTS

| | | |
|---|---|---|
| 2008/0165134 A1 | 7/2008 | Krah |
| 2010/0060593 A1* | 3/2010 | Krah .............................. 345/173 |
| 2010/0079401 A1 | 4/2010 | Staton |
| 2010/0079402 A1 | 4/2010 | Grunthaner et al. |
| 2011/0084930 A1* | 4/2011 | Chang et al. .................. 345/173 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

NOISE REDUCTION FOR TOUCH CONTROLLER

FIELD

This relates generally to touch controllers in touch sensitive devices and more particularly, to noise reduction for touch controllers in touch sensitive devices.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover at least a portion of the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch sensitive devices can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

The ability to recognize and interpret the touch or hover event can be compromised by noise introduced into the touch sensitive device by various components. However, it can be challenging to substantially reduce or eliminate the noise so that the touch sensitive device can perform touch and hover operations effectively and efficiently.

SUMMARY

This relates to a touch sensitive device having a touch controller with noise reduction circuitry. The touch controller can include a transmit section for generating stimulation signals to drive a touch display to sense a touch or hover event. The touch controller can also include a receive section for processing touch signals from the touch display indicative of the touch or hover event. Noise can be introduced into the stimulation signals and propagated through the touch sensitive device components into the touch signals, thereby interfering with touch and hover sensing. To reduce the noise, the touch controller can operate noise reduction circuitry in the transmit section, the receive section, or both. In one example, the transmit section's noise reduction circuitry can isolate and subtract noise from the stimulation signals. In another example, the receive section's noise reduction circuitry can isolate and subtract noise from the touch signals. In still another example, the transmit section's noise reduction circuitry can isolate and subtract some noise from the stimulation signals, while the receive section's noise reduction circuitry can isolate and subtract remaining noise from the touch signals. In addition to a touch display, the touch controller can be similarly used with a touch sensor panel. Noise reduction circuitry can advantageously improve touch and hover sensing in the touch sensitive device by providing clearer, more accurate touch and hover events for processing.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a touch sensitive device having a touch controller with noise reduction circuitry. The touch controller can include a transmit section for generating stimulation signals to drive a touch display to sense a touch or hover event. The touch controller can also include a receive section for processing touch signals from the touch display indicative of the touch or hover event. Noise, e.g., correlated or common mode noise, can be introduced into the stimulation signals and propagated through the touch sensitive device components into the touch signals, thereby interfering with touch and hover sensing. To reduce the noise, the touch controller can operate noise reduction circuitry in the transmit section, the receive section, or both. In some embodiments, the transmit section's noise reduction circuitry can isolate and subtract noise from the stimulation signals. In some embodiments, the receive section's noise reduction circuitry can isolate and subtract noise from the touch signals. In some embodiments, the transmit section's noise reduction circuitry can isolate and subtract some noise from the stimulation signals, while the receive section's noise reduction circuitry to isolate and subtract remaining noise from the touch signals. Noise reduction circuitry can advantageously improve touch and hover sensing in the touch sensitive device by providing clearer, more accurate touch and hover events for processing.

Although various embodiments describe the touch controller being used with a touch display, it is to be understood that the touch controller can also be used in the same or a similar manner with a touch sensor panel (i.e., without a display) and any other touch sensitive device according to various embodiments.

Figure 1:
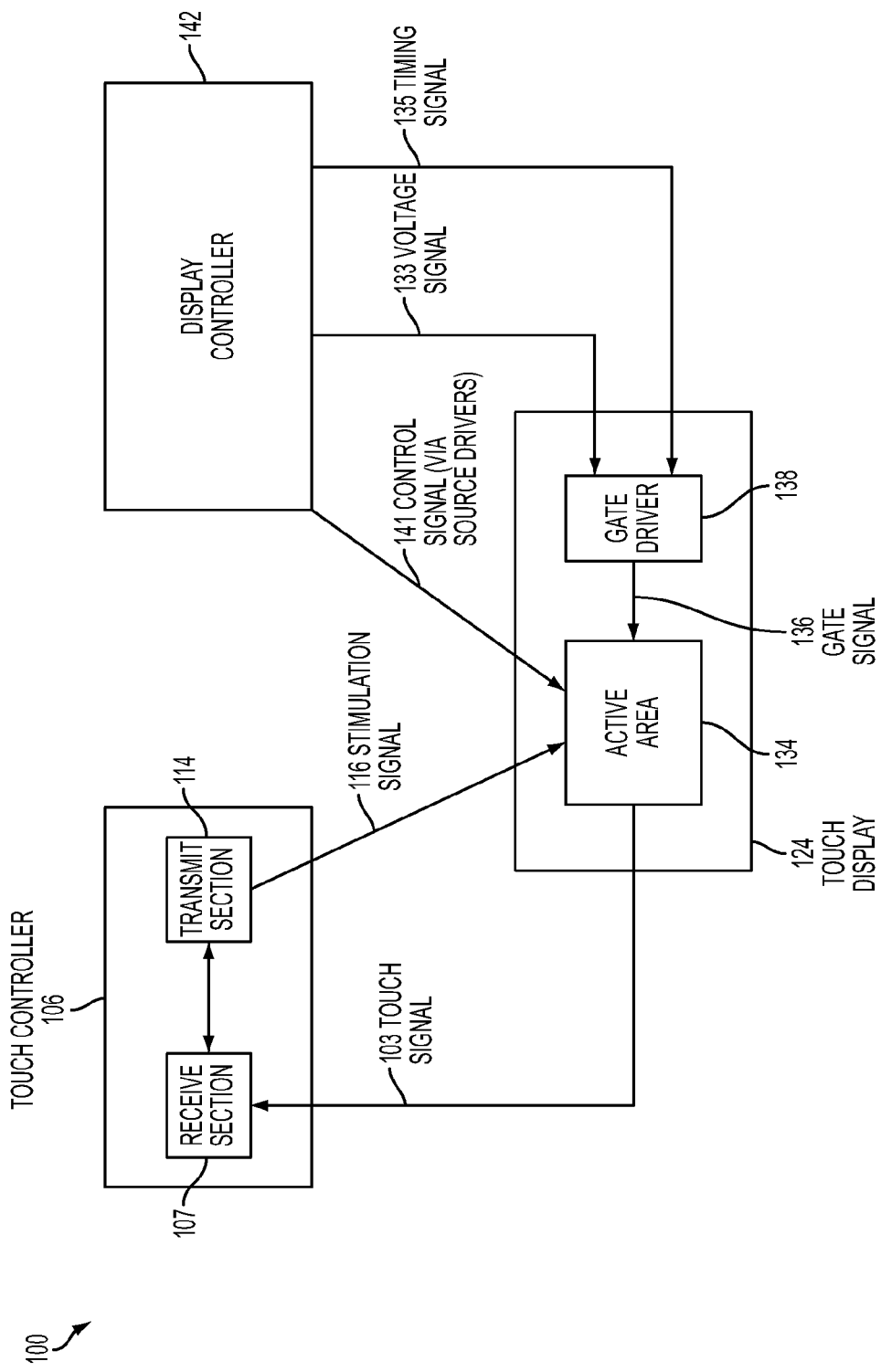
FIG. 1 illustrates an exemplary touch sensitive device having a touch controller with noise reduction circuitry according to various embodiments.

FIG. 1 illustrates an exemplary touch sensitive device having a touch controller with noise reduction circuitry according to various embodiments. In the example of FIG. 1, touch sensitive device 100 can include touch display 124 for displaying image and/or graphics data on circuitry, e.g., pixels, during display mode and for sensing a touching and/or hovering object by circuitry, e.g., pixels, during touch mode. The touch display 124 can include active area 134 having pixels for displaying the data and sensing the object touch and/or hover. The touch display 124 can also include gate driver 138 for driving the active area 134 with gate signals 136 during the display and touch modes to facilitate the displaying and sensing. The touch sensitive device 100 can also include touch controller 106 for controlling the touch display 124 during the touch mode. The touch controller 106 can include transmit section 114 for driving the touch display 124 via stimulation signals 116 to sense the object touch and/or hover. The touch controller 106 can also include receive section 107 for receiving and processing touch signals 103 from the touch display 124 indicative of the sensed touch and/or hover. The touch sensitive device 100 can further include display controller 142 for controlling the touch display 124 during the display mode. The display controller 142 can supply voltage signals 133 and timing signals 135 to the gate driver 138 to cause the gate driver to drive the touch display 124 via the gate signals 136 during the display mode and to remain static during the touch mode. The display controller 142 can also transmit pixel control signals 141 via source drivers (not shown) to the active area 134 to facilitate the displaying of data at the touch display 124. The transmit section 114 and/or the receive section 107 of the touch controller 106 can include noise reduction circuitry, according to various embodiments, to reduce noise present in the stimulation signals 116 and the touch signals 103, thereby improving touch and hover sensing. Examples of the noise reduction circuitry will be described in more detail below.

It is to be understood that the touch sensitive device of FIG. 1 is not limited to the components and configuration shown, but can include other and/or additional components and configurations according to various embodiments. For example, the touch controller and the display controller can be integrated into a single controller. Or the gate driver can be separate from the touch display. Or the gate driver and the display controller can be omitted in devices that do not require data displaying, e.g., track-pads.

Figure 2:
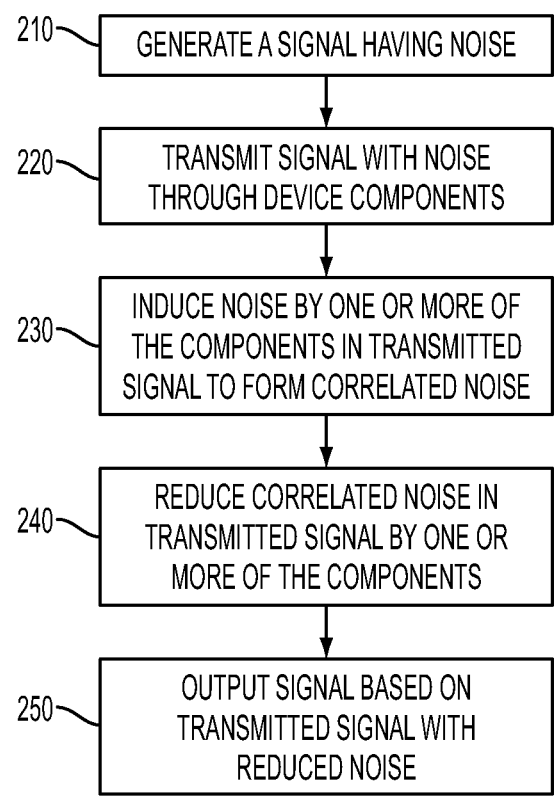
FIG. 2 illustrates an exemplary method of reducing noise in a touch sensitive device, such as in FIG. 1, according to various embodiments.

FIG. 2 illustrates an exemplary method of reducing noise for a touch controller in a touch sensitive device according to various embodiments. In the example of FIG. 2, a component in a transmit section of a touch controller can generate a stimulation signal for driving a touch display (210). The component can inadvertently induce noise in the generated signal. The stimulation signal with the noise can be transmitted to downstream components in the transmit section for further processing before driving the touch display (220). The downstream components can also induce noise in the processed signal (230). Since the noise source is a single upstream component, the noise induced by and/or propagating through the downstream components can be additive and therefore appear as correlated noise or common mode noise on the processed signal across multiple drive inputs (or ports) to the touch display. The correlated noise can subsequently be reduced in the transmit section of the touch controller, in a receive section of the touch controller, or in both, as will be described in more detail below, to improve touch and hover sensing (240). In the transmit section, the noise can be reduced in the stimulation signal. In the receive section, the noise can be reduced in a touch signal generated from the stimulation signal and transmitted to the receive section from the touch display. The stimulation signal with reduced noise can then drive the touch display and the touch signal with reduced noise can then be used to perform some operation of the touch sensitive device (250).

Figure 3:
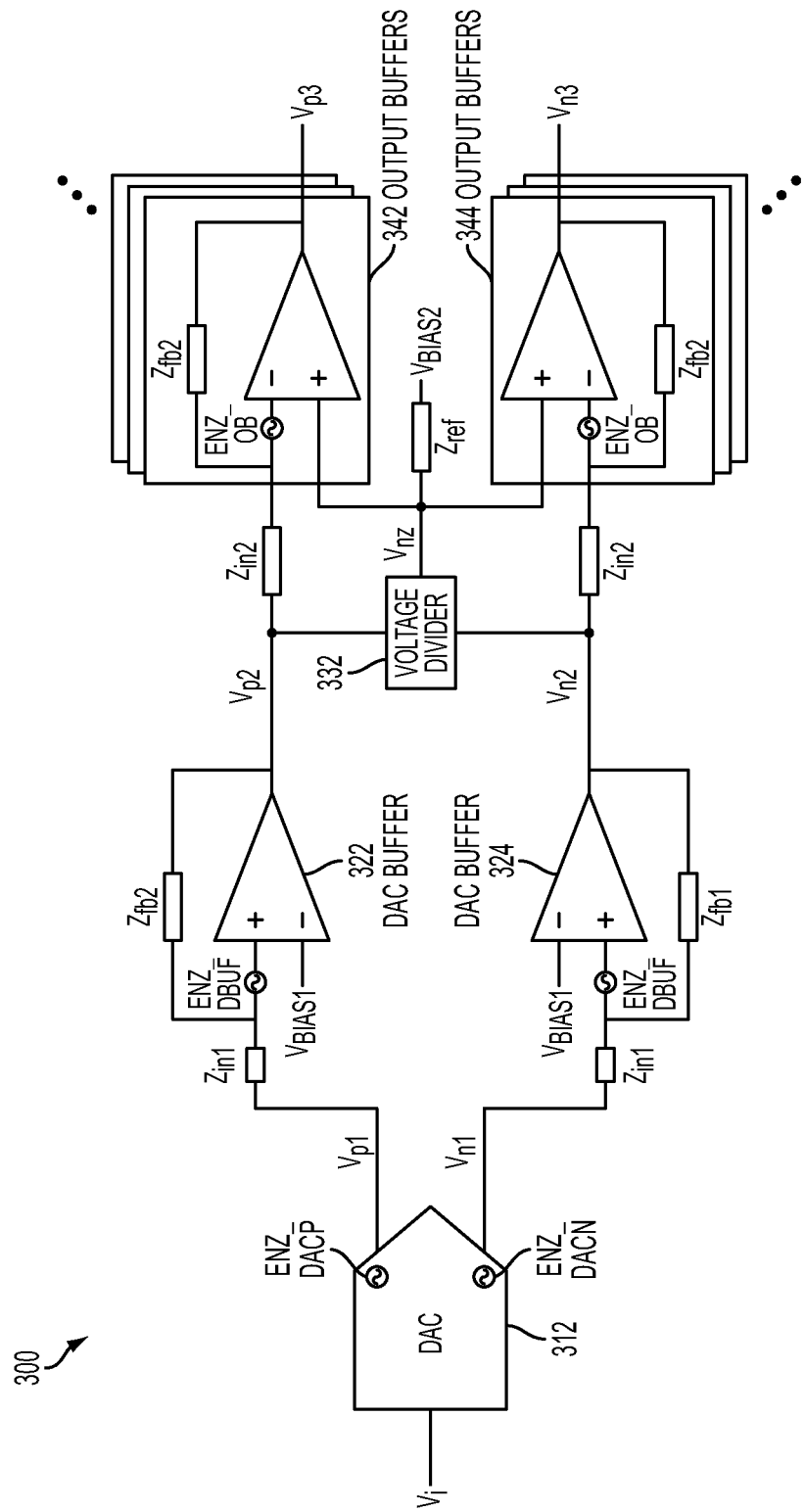
FIG. 3 illustrates an exemplary touch controller having a transmit section with noise reduction circuitry according to various embodiments.

FIG. 3 illustrates an exemplary transmit section of a touch controller having noise reduction circuitry according to various embodiments. In the example of FIG. 3, transmit section 300 can generate stimulation signals for driving a touch display (not shown). The transmit section 300 can include digital-to-analog converter (DAC) 312 for generating stimulation signals to drive the touch display. The DAC 312 can output a positive stimulation signal Vp1 and a negative stimulation signal Vn1, each signal having induced noise. The transmit section 300 can also include DAC buffers 322, 324 to receive the respective stimulation signals Vp1, Vn1 from the DAC 312. The DAC buffers 322, 324 can have input impedances Zin1 and feedback impedances Zfb1. In some embodiments, the DAC buffers 322, 324 can amplify the stimulation signals Vp1, Vn1 to an effective level to drive the touch display, where the gain of the DAC buffers can be (1+Zfb1/Zin1). As a consequence, the induced noise in the stimulation signals Vp1, Vn1 can also be amplified. The DAC buffers 322, 324 can also induce additional noise into the stimulation signals Vp1, Vn1 to form correlated noise or common mode noise in the stimulation signals Vp2, Vn2 outputted from the buffers.

The transmit section 300 can include voltage divider 332, with characteristic impedance Zdiv, to receive the stimulation signals Vp2, Vn2 from the buffers 322, 324 and to isolate the correlated noise Vnz therefrom. The center tap of the voltage divider 332 can be connected via impedance Zref to a second bias voltage Vbias2 and also to the non-inverting input of the output buffers. Because the stimulation signals Vp2, Vn2 are closely matched, they can cancel each other out in the voltage divider 332, leaving the correlated noise Vnz as an output from the divider. The transmit section 300 can also include output buffers 342, 344 to receive the respective stimulation signals Vp2, Vn2 from the DAC buffers 322, 324 and the isolated noise Vnz from the voltage divider 332. The output buffers 342, 344 can have input impedances Zin2 and feedback impedance Zfb2. Assuming Zfb2/Zin2=Zref/Zdiv, the voltage at the output of the output buffer 342 can be as follows.

$$Vp3 = (Vob\_ref - Vp2) * \left(\frac{Zfb2}{Zin2}\right) + Vbias2, \quad (1)$$

where Vp3=the positive stimulation signal output from the output buffer 342, Vob_ref=the voltage at the center of the voltage divider 332, Vp2=the positive stimulation signal output from the DAC buffer 322, Zfb2=the feedback impedance of the output buffer 342, Zin2=the input impedance of the output buffer 342, and Vbias2=the bias voltage inputted to the output buffer 342. Similarly, the voltage at the output of the output buffer 344 can be as follows.

$$Vn3 = (Vob\_ref - Vn2) * \left(\frac{Zfb2}{Zin2}\right) + Vbias2, \quad (2)$$

where Vn3=the negative stimulation signal output from the output buffer 344, Vn2=the negative stimulation signal output from the DAC buffer 324, Zfb2=the feedback impedance of the output buffer 344, Zin2=the input impedance of the output buffer 344, and Vbias2=the bias voltage inputted to the output buffer 344.

The output buffers 342, 344 can operate as differential buffers to subtract the isolated noise Vnz from the stimulation signals Vp2, Vn2 and to refer the output buffer dynamic signal to a second bias voltage level Vbias2. An array of the output buffers 342, 344 can then output the respective stimulation signals Vp3, Vn3 with substantially reduced noise to the touch display for touch and hover sensing.

In an example, the stimulation signals Vp1, Vn1 outputted from the DAC 312 can contribute voltage noise densities ENZ_DACP and ENZ_DACN, respectively. As a result, each DAC buffer 322, 324 can have input referred voltage noise densities ENZ_DBUF and each output buffer 342, 344 can have input referred voltage noise densities ENZ_OB. For simplicity, in this example, it is assumed that the various passive feedback and input impedances Zin1, Zin2, Zfb1, Zfb2 and bias references Vbias1, Vbias2 are noise free or have negligible noise.

Without noise compensation, the total correlated output noise density of the positive stimulation signal Vp3 due to the DAC induced output noise density of the positive stimulation signal Vp1 alone could be as follows.

$$ENZ\_Vp3 = G\_DBUF * G\_OB * ENZ\_DACP, \quad (3)$$

where ENZ_Vp3=the total correlated output noise density of the stimulation signal Vp3, G_DBUF=the gain of the DAC buffer 322, G_OB=the gain of the output buffer 342, and ENZ_DACP=the voltage noise density contributed by the DAC 312 in the stimulation signal Vp1. Similarly, without noise compensation, the total correlated output noise density of the negative stimulation signal Vn3 due to the DAC induced output noise density of the negative stimulation signal Vn1 alone could be as follows.

$$ENZ\_Vn3 = G\_DBUF * G\_OB * ENZ\_DACN, \quad (4)$$

where ENZ_Vn3=the total correlated output noise density of the stimulation signal Vn3, G_DBUF=the gain of the DAC buffer 324, G_OB=the gain of the output buffer 344, and ENZ_DACN=the voltage noise density contributed by the DAC 312 in the stimulation signal Vn1.

It should be understood that a correlated noise component in the stimulation signals Vp3, Vn3, as the noise component distributed to the drive ports of a touch display, can be additive in nature, such that the noise component can be n times higher across the drive ports than it would have been at the output of a single output buffer, where n=the number of drive ports. In contrast, an uncorrelated noise component in the stimulation signals Vp3, Vn3, can be scaled by the square root of the total number of drive lines (of a touch display) driven by the stimulation signals, such that the uncorrelated noise component can be √n times lower than the correlated noise component.

By using noise compensation, according to various embodiments, the dominant correlated noise component can be substantially reduced or eliminated, as described in the following example.

The voltage noise density at the output of the DAC buffer 322 can be as follows.

$$ENZ\_Vp2 = G\_DBUF * ENZ\_DACP, \quad (5)$$

where ENZ_Vp2=the voltage noise density of the stimulation signal Vp2, G_DBUF=the gain of the DAC buffer 322, and ENZ_DACP=the voltage noise density contributed by the DAC 312 in the stimulation signal Vp1. Here, the voltage noise density contributed by the DAC 312 can be scaled by the gain of the DAC buffer 322 to provide the voltage noise density at the output of the DAC buffer. Similarly, the voltage noise density at the output of the DAC buffer 324 can be as follows.

$$ENZ\_Vn2 = G\_DBUF * ENZ\_DACN, \quad (6)$$

where ENZ_Vn2=the voltage noise density of the stimulation signal Vn2, G_DBUF=the gain of the DAC buffer 324, and ENZ_DACN=the voltage noise density contributed by the DAC 312 in the stimulation signal Vn1. Here, the voltage noise density contributed by the DAC 312 can be scaled by the gain of the DAC buffer 324 to provide the voltage noise density at the output of the DAC buffer.

The center tap Vob_ref of the voltage divider 332 can see half of the noise densities ENZ_Vn2, ENZ_Vp2, represented as follows.

$$Vob\_ref = (\tfrac{1}{2} ENZ\_Vn2, \tfrac{1}{2} ENZ\_Vp2), \quad (7)$$

where the comma separating the components is a notation used herein to identify individual noise contributors and to separate correlated and non-correlated noise components.

Therefore, with noise compensation, the total correlated output noise density of the positive stimulation signal Vp3 due to the DAC induced output noise density of the positive stimulation signal Vp1 can be as follows.

$$ENZ\_Vp3 = (Vob\_ref - ENZ\_Vp2) * \left(\frac{Zfb2}{Zin2}\right), \quad (8)$$

where ENZ_Vp3=the total correlated output noise density of the stimulation signal Vp3 outputted by the output buffer 342, Vob_ref=the voltage at the center of the voltage divider 332, ENZ_Vp2=the voltage noise density of the stimulation signal Vp2, Zfb2=the feedback impedance of the output buffer 342, and Zin2=the input impedance of the output buffer 342. Compared to the noise density without noise compensation, as in Equation (3), the noise density with noise compensation, as in Equation (8), can be substantially lower.

Similarly, with noise compensation, the total correlated output noise density of the negative stimulation signal Vn3 due to the DAC induced output noise density of the negative stimulation signal Vn1 can be as follows.

$$\text{ENZ\_Vn3} = (\text{Vob\_ref} - \text{ENZ\_Vn2}) * \left(\frac{Zfb2}{Zin2}\right), \quad (9)$$

where ENZ_Vn3=the total correlated output noise density of the stimulation signal Vn3 outputted by the output buffer 344, ENZ_Vn2=the voltage noise density of the stimulation signal Vp2, Zfb2=the feedback impedance of the output buffer 344, and Zin2=the input impedance of the output buffer 344. Compared to the noise density without noise compensation, as in Equation (4), the noise density with noise compensation, as in Equation (9), can be substantially lower.

Due to half of a touch display being driven with the positive stimulation signal Vp3 and the other half being driven with the negative stimulation signal Vn3, the total correlated noise component ENZ_SAO at the output of a touch controller's receive section's sense amplifier (from touch signals received from a touch display and then processed) can be as follows.

$$\text{ENZ\_SAO} = \quad (10)$$
$$((\text{NSTM\_P} * \text{ENZ\_Vp3}) + (\text{NSTM\_N} * \text{ENZ\_Vn3})) * \left(\frac{Csig}{Cfb}\right),$$

where Csig=the touch signal capacitance, Cfb=the feedback capacitance of the sense amplifier, NSTM_P=the number of ports driven with the positive stimulation signal Vp3, NSTM_N=the number of ports driven with the negative stimulation signal Vn3, ENZ_Vp3=the total correlated output noise density of the stimulation signal Vp3 outputted by the output buffer 342, and ENZ_Vn3=the total correlated output noise density of the stimulation signal Vn3 outputted by the output buffer 344.

Written another way, Equation (10) becomes $$\text{ENZ\_SAO} = (\text{NSTM\_P} + \text{NSTM\_N}) * \left(\frac{Csig}{Cfb}\right) * \text{G\_OB} * \quad (11)$$
$$\left(-\text{G\_DBUF} * \text{ENZ\_DACP}, \frac{1}{2}\text{G\_DBUF} * \text{ENZ\_DACP},\right.$$
$$\frac{1}{2}\text{G\_DBUF} * \text{ENZ\_DACN}, -\text{G\_DBUF} * \text{ENZ\_DACN},$$
$$\left.\frac{1}{2}\text{G\_DBUF} * \text{ENZ\_DACP}, \frac{1}{2}\text{G\_DBUF} * \text{ENZ\_DACN}\right)$$

where the noise components expressed in the parentheses can be subdivided into two uncorrelated terms, each being zero, as follows.

$$\begin{pmatrix} \text{ENZ\_DACP} * \left(\frac{1}{2}\text{G\_DBUF} + \frac{1}{2}\text{G\_DBUF} - \text{G\_DBUF}\right), \\ \text{ENZ\_DACN} * \left(\frac{1}{2}\text{G\_DBUF} + \frac{1}{2}\text{G\_DBUF} - \text{G\_DBUF}\right) \end{pmatrix} = \quad (12)$$
$$(0, 0) = 0.$$

Accordingly, this noise reduction scheme according to various embodiments can reduce noise by subtracting half of the correlated noise in the stimulation signals at the output buffers 342, 344, and then converting the remaining correlated noise from single ended to differential noise, which can then be canceled in the touch controller's receive section. The conversion from single ended to differential noise can be accomplished by cross coupling the isolated noise Vnz at point Vob_ref between output buffers of opposite polarity.

The example of FIG. 3 illustrates transmit section components for outputting two stimulation signals to drive a touch display. However, it is to be understood that additional similar components can be used to generate and output more than two stimulation signals according to the needs of the touch display.

Figure 4:
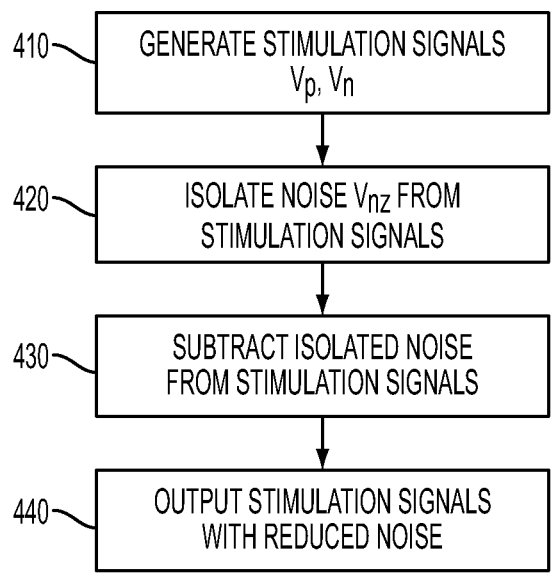
FIG. 4 illustrates an exemplary method of reducing noise in a touch controller, such as in FIG. 3, according to various embodiments.

FIG. 4 illustrates an exemplary method of reducing noise in a touch controller of a touch sensitive device according to various embodiments. This method can be applied to the touch controller of FIG. 3, for example. In the example of FIG. 4, a positive stimulation signal Vp1 and a negative stimulation signal Vn1 with noise can be generated, for example, by a DAC (410). The noise can come from the component generating the stimulation signals and/or from downstream components processing the stimulation signals. In some embodiments, the noise can be correlated or common mode. The noise can be isolated from the stimulation signals Vp1, Vn1, for example, by a voltage divider (420). The isolated noise can then be subtracted from the stimulation signals Vp2, Vn2, for example, by a differential output buffer (430). The resulting stimulation signals Vp3, Vn3 can be outputted with substantially reduced noise (440).

Figure 5:
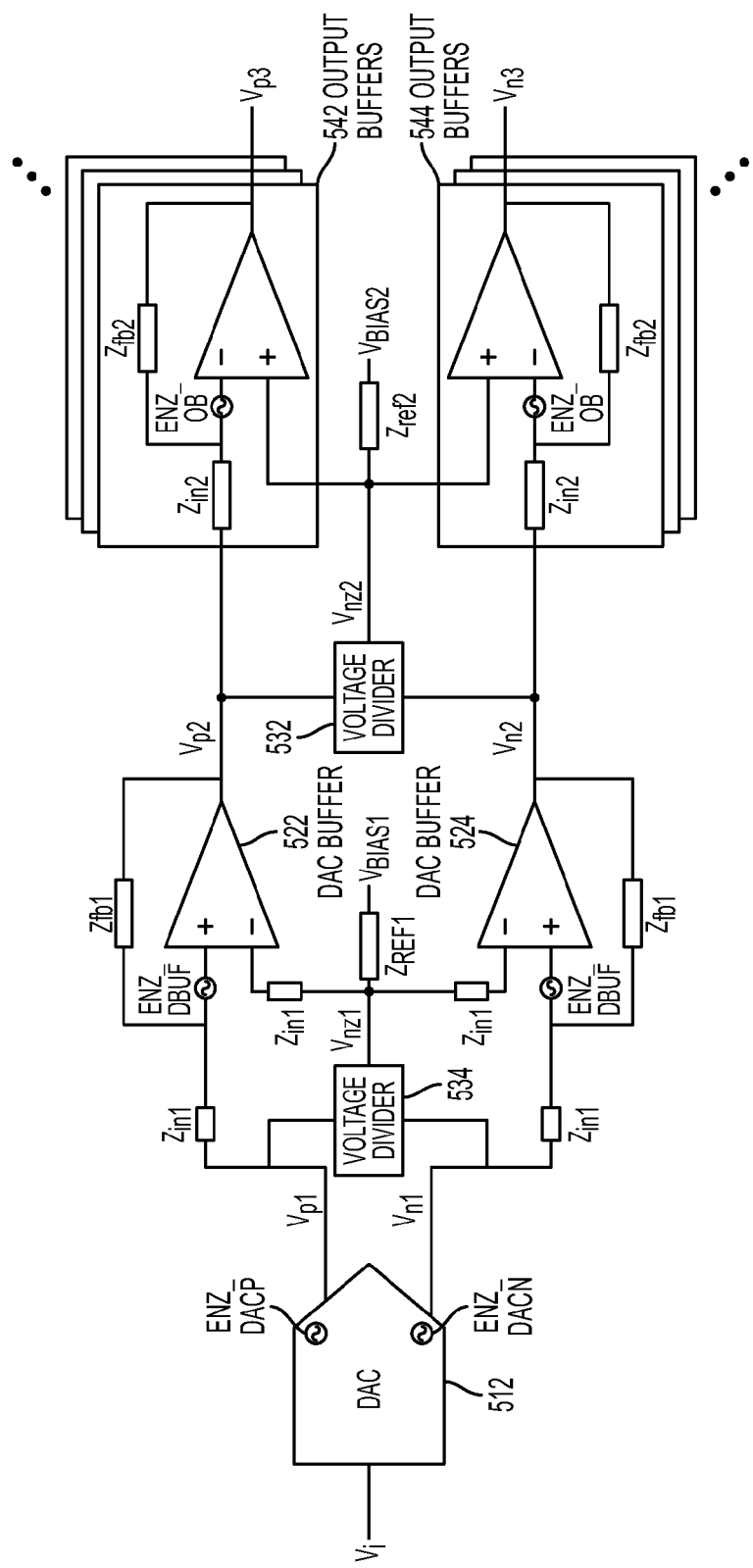
FIG. 5 illustrates another exemplary touch controller having a transmit section with noise reduction circuitry according to various embodiments.

FIG. 5 illustrates another exemplary transmit section of a touch controller having noise reduction circuitry according to various embodiments. The transmit section of FIG. 5 is similar to that of FIG. 3 with the addition of a second voltage divider between the DAC and DAC buffers. In the example of FIG. 5, transmit section 500 can include DAC 512 to generate a positive stimulation signal Vp1 and a negative stimulation signal Vn1, each signal having induced noise. The transmit section 500 can also include first voltage divider 534 to receive the stimulation signals Vp1, Vn1 from the DAC 512 and to isolate the induced noise Vnz1 therefrom. The transmit section 500 can include DAC buffers 522, 524 to receive the respective stimulation signals Vp1, Vn1 from the DAC 312 and the isolated noise Vnz1 from the voltage divider 534. The DAC buffers 522, 524 can have feedback impedances Zfb1 and input impedances Zin1. The buffers 522, 524 can operate as differential buffers to subtract the isolated noise Vnz1 from the stimulation signals Vp1, Vn1. Here, common mode voltage at the output of the DAC buffers 522, 524 can advantageously be independent on the common mode voltage of the DAC 512. As such, a separate bias voltage input for the DAC buffers 522, 524 can be omitted (as opposed to the separate bias voltage input Vbias1 in FIG. 3).

The buffers 522, 524 can then output the respective stimulation signals Vp2, Vn2 with the noise from the DAC 512 substantially reduced. However, the buffers 522, 524 can also induce noise in the stimulation signals Vp2, Vn2, which can be isolated and reduced as described in FIG. 3. That is, in the example of FIG. 5, the transmit section 500 can include second voltage divider 532 to isolate noise Vnz2 from the stimulation signals Vp2, Vn2 outputted by the DAC buffers 522, 524. The transmit section 500 can also include output buffers 542, 544 to receive the respective stimulation signals Vp2, Vn2 from the DAC buffers 522, 524 and the isolated noise Vnz2 from the second voltage divider 532. The output buffers 542, 544 can have input impedances Zin2 and feedback impedances Zfb2. The output buffers 542, 544 can operate as differential buffers to subtract the isolated noise Vnz2 from the stimulation signals Vp2, Vn2. An array of output buffers 542, 544 can then output respective stimulation signals Vp3, Vn3 with substantially reduced noise to the touch display for touch and hover sensing.

The example of FIG. 5 illustrates transmit section components for outputting two stimulation signals to drive a touch display. However, it is to be understood that additional similar components can be used to generate and output more than two stimulation signals according to the needs of the touch display.

Figure 6:
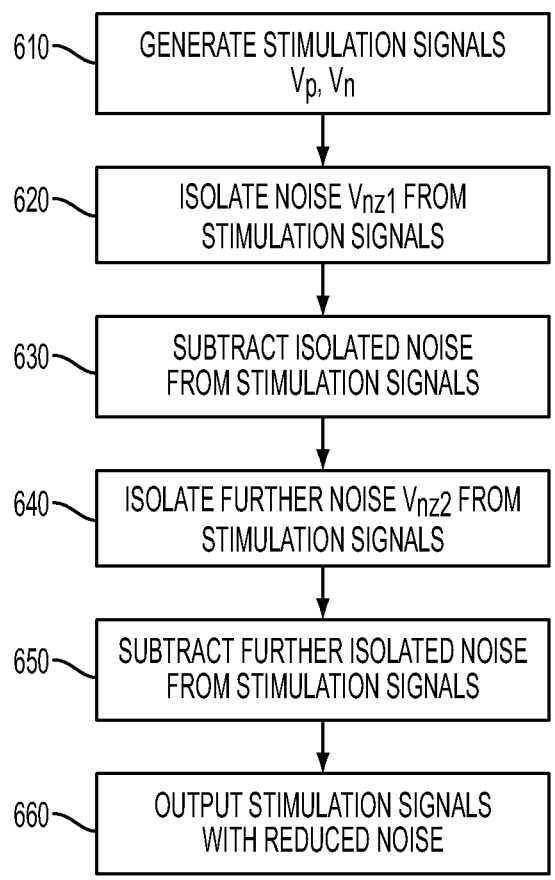
FIG. 6 illustrates an exemplary method of reducing noise in a touch controller, such as in FIG. 5, according to various embodiments.

FIG. 6 illustrates another exemplary method of reducing noise in a touch controller of a touch sensitive device according to various embodiments. This method can be applied to the touch controller of FIG. 5, for example. In the example of FIG. 6, a positive stimulation signal Vp and a negative stimulation signal Vn with noise can be generated, for example, by a DAC (610). The noise can come from the component generating the stimulation signals. In some embodiments, the noise can be correlated or common mode. The noise can be isolated from the stimulation signals Vp, Vn, for example, by a voltage divider (620). The isolated noise can then be subtracted from the stimulation signals Vp, Vn, for example, by a DAC buffer (630). Further noise, either added or remaining, can be isolated from the stimulation signals Vp, Vn, for example, by another voltage divider (640). The additional noise can be residual noise from the component generating the stimulation signals and/or induced noise from downstream components processing the stimulation signals. In some embodiments, the noise can be correlated or common mode. The further isolated noise can be subtracted from the stimulation signals Vp, Vn, for example, by a differential output buffer (650). The resulting stimulation signals Vp, Vn can be outputted with substantially reduced noise (660).

Figure 7:
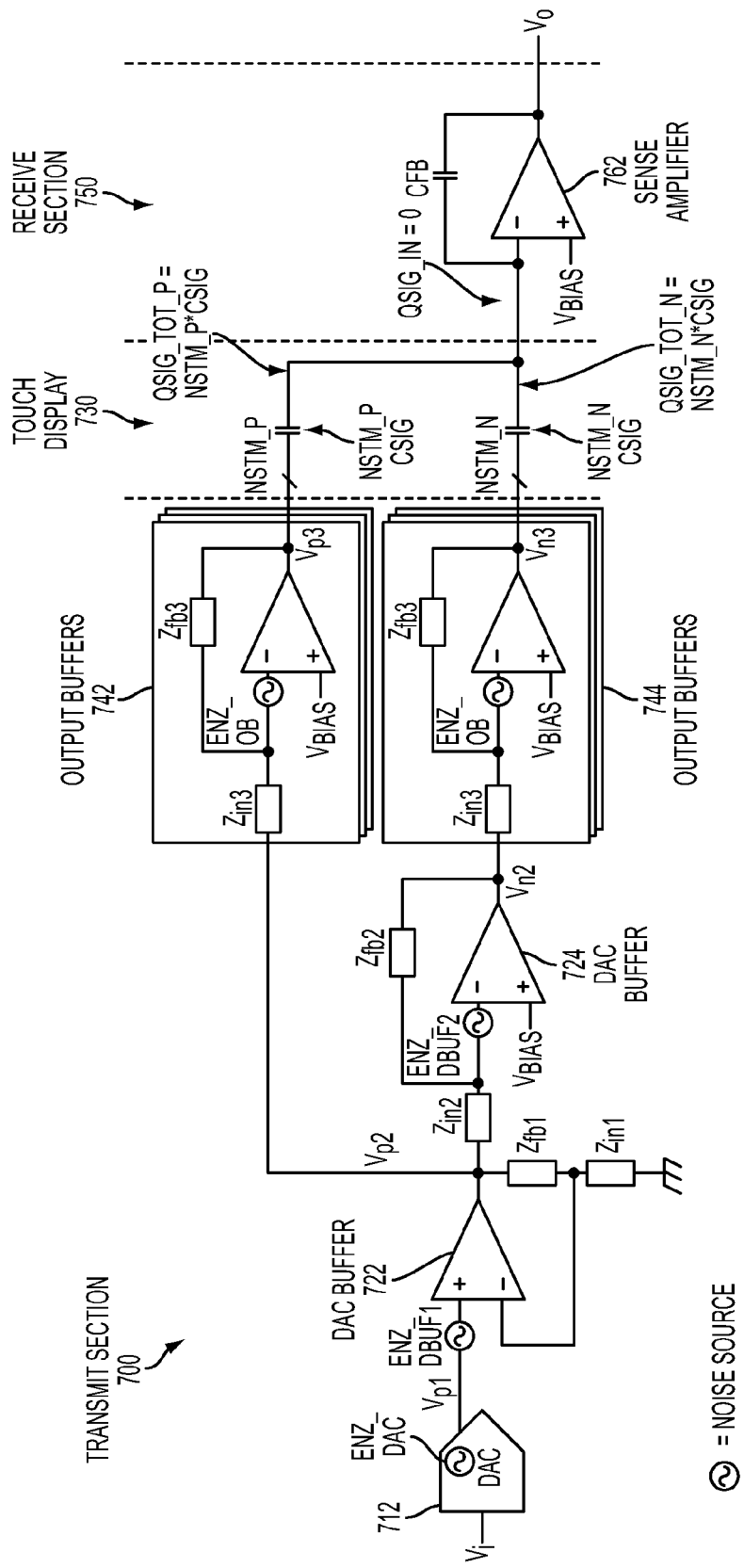
FIG. 7 illustrates an exemplary touch controller having transmit and receive sections with noise reduction circuitry according to various embodiments.

FIG. 7 illustrates an exemplary transmit section and receive section of a touch controller having noise reduction circuitry according to various embodiments. In the example of FIG. 7, transmit section 700 can generate stimulation signals for driving touch display 730 and receive section 750 can process touch signals generated from the stimulation signals at the touch display. The transmit section 700 can include digital-to-analog converter (DAC) 712 for generating stimulation signals to drive the touch display 730. The DAC 712 can output a positive stimulation signal Vp1 having induced noise. The transmit section 700 can also include first DAC buffer 722 to receive the stimulation signal Vp1 from the DAC 712. The DAC buffer 722 can have feedback impedances Zfb1 and Zin1. In some embodiments, the DAC buffer 722 can amplify the stimulation signal Vp1 to an effective level to drive the touch display and/or facilitate noise reduction. The gain of the DAC buffer 722 can be (1+Zfb1/Zin1). As a consequence of amplifying the stimulation signal Vp1 by the gain, the induced noise in the stimulation signal can also be amplified. The first DAC buffer 722 can also induce additional noise into the stimulation signal Vp1 to form correlated noise or common mode noise in the stimulation signal Vp2 outputted from the buffer.

The first DAC buffer 722 can output the stimulation signal Vp2 to first output buffer 742 and to the second DAC buffer 724 in the transmit section 700. The second DAC buffer 724, which can be configured as an inverter, can invert the stimulation signal Vp2 into a negative stimulation signal Vn2 having inverted induced noise. The DAC buffer 724 can also induce additional noise into the signal Vn2. The DAC buffer 724 can have an input impedance Zin2 and feedback impedance Zfb2, where the gain of the second DAC buffer 724 can be −Zfb2/Zin2. In some embodiments, the second DAC buffer 724 can invert and amplify the stimulation signal Vp2 to an effective level to drive the touch display and/or facilitate noise reduction. As a consequence of amplifying and inverting the stimulation signal Vp2, the induced noise in the stimulation signal can also be amplified. The gain (or amplification) of the DAC buffers 722, 724 can be set based on the touch display drive requirements and/or the noise reduction needs. In some embodiments, the gain of the first DAC buffer 722 can be larger than the gain of the second DAC buffer 724 to facilitate noise reduction. For example, the gain in the first DAC buffer can be 4, while the gain in the second DAC buffer can be 1. In some embodiments, the second DAC buffer 724 can induce additional noise into the stimulation signal Vp2. However, due to the different gains in the DAC buffers 722, 724, the induced noise from the second DAC buffer 724 can be negligible compared to that from the first DAC buffer 722.

The second DAC buffer 724 can output the negative stimulation signal Vn2 to second output buffer 744 in the transmit section. The output buffers 742, 744 can output the respective stimulation signals Vp3, Vn3 with induced noise to the touch display 730. The output buffers 742, 744 can have input impedances Zin3 and feedback impedances Zfb3. The first output buffer 722 can output the induced noise from the DAC 712 and the first DAC buffer 722 in the positive stimulation signal Vp3. The second output buffer 724 can output the induced noise, inverted, from the DAC 712 and the first DAC buffer 722 in the negative stimulation signal Vn3.

Receive section 750 can include sense amplifier 762 for receiving and processing touch signals generated at the touch display 730. The sense amplifier 762 can include a feedback capacitor Cfb. The touch display 730 can be driven by the stimulation signals Vp3, Vn3 from the transmit section's output buffers 742, 744 to generate touch signals indicative of a touch or hover at the display. An array of NSTM_P output buffers 742 can couple into NSTM_P signal capacitors Csig in the touch display 730 generating signal charge NSTM_P*Csig*Vp3 into the inverting input node of the sense amplifier 762, where NSTM_P=the number of output buffers 742 outputting a positive stimulation signal Vp3. Similarly, an array of NSTM_N output buffers 744 can couple into NSTM_N signal capacitors Csig in the display 730 generating signal charge NSTM_N*Csig*Vn3 into the inverting input node of the sense amplifier 762, where NSTM_N=the number of output buffers 744 outputting a negative stimulation signal Vn3. Since Vp3=−Vn3, the effective charge Qsig_in into the sense amplifier 762 can be zero, in the absence of a touch or hover at the display 730, and can be non-zero if one of the Csig capacitors in the display is modulated by Csig_sns, i.e., a change in sense capacitance due to a touch or hover at the display.

In an example, the DAC 712 can have an output voltage noise density ENZ_DAC. The first DAC buffer 722 can have an input referred noise density ENZ_DBUF1. The second DAC buffer 724 can have an input referred noise density ENZ_DBUF2. The output buffers 742, 744 can have a noise density ENZ_OB. For simplicity, in this example, it is assumed that the various passive feedback and input impedances Zin1, Zin2, Zin3, Zfb1, Zfb2, Zfb3, and bias reference Vbias are noise free or have negligible noise. Accordingly, the total correlated output noise density of the stimulation signal Vp3 outputted by the output buffer 742 can be as follows.

$$ENZ\_Vp3 = G\_DBUF1 * G\_OB * ENZ\_DAC, \quad (13)$$

where ENZ_Vp3=the total correlated output noise density of the stimulation signal Vp3, G_DBUF1=the gain of the first DAC buffer 722, G_OB=the gain of the output buffer 742, and ENZ_DAC=the voltage noise density contributed by the DAC 712 in the stimulation signal Vp1.

The total correlated output noise density of the negative stimulation signal Vn3 due to the DAC induced noise density of the negative stimulation signal Vn1 can be as follows.

$$ENZ\_Vn3 = \begin{pmatrix} G\_OB * (1 + G\_DBUF2) * ENZ\_DAC, \\ G\_OB * G\_DBUF2 * ENZ\_DBUF2 \end{pmatrix}, \quad (14)$$

where ENZ_Vn3=the total correlated output noise density of the stimulation signal Vn3, G_DBUF2=the gain of the second DAC buffer 724, G_OB=the gain of the output buffer 744, ENZ_DAC=the voltage noise density contributed by the DAC 712 in the stimulation signal Vp1, and ENZ_DBUF2=the voltage noise density contributed by the DAC buffer 724 in the stimulation signal Vn2.

As described above regarding Equation (10), due to half of the touch display 730 being driven with the positive stimulation signal Vp3 and the other half being driven with the negative stimulation signal Vn3, the total correlated noise component ENZ_SAO at the output of the sense amplifier 762 in the receive section 750 can be as follows.

$$ENZ\_SAO = \quad (15)$$
$$((NSTM\_P * ENZ\_Vp3) + (NSTM\_N * ENZ\_Vn3)) * \left(\frac{Csig}{Cfb}\right),$$

where Csig=the touch signal capacitance, Cfb=the feedback capacitance of the sense amplifier 762, NSTM_P=the number of ports driven with the positive stimulation signal Vp3, NSTM_N=the number of ports driven with the negative stimulation signal, ENZ_Vp3=the total correlated output noise density of the stimulation signal Vp3 outputted by the output buffer 742, and ENZ_Vn3=the total correlated output noise density of the stimulation signal Vn3 outputted by the output buffer 744.

Suppose that the gains of the DAC buffers 722, 724 are opposite, e.g., G_DBUF1=−G_DBUF2=1, and the gain of the output buffers 724, 744 are G_OB=−1. Substituting Equations (13) and (14) and the gains into Equation (15) can result in the following.

$$ENZ\_SAO = (NSTM\_P + NSTM\_N) * \quad (16)$$
$$\left(\frac{Csig}{Cfb}\right) * (ENZ\_DAC - ENZ\_DAC, ENZ\_DBUF2),$$

where the DAC induced correlated noise component ENZ_DAC can cancel out because of the inversion in the second DAC buffer 724 of the positive stimulation signal Vp2 (and the induced noise) into the negative stimulation signal Vn2 (and the induced noise), leaving the correlated noise induced by the second DAC buffer in the negative stimulation signal Vn2 to be additive across the drive ports at the touch display 730 and subsequently at the output of the sense amplifier 762 as follows.

$$ENZ\_SAO = (-NSTM\_N * ENZ\_DBUF2) * \left(\frac{Csig}{Cfb}\right), \quad (17)$$

where this remaining noise component can be small enough to be negligible is some instances.

The example of FIG. 7 illustrates transmit section components for outputting two stimulation signals Vp3, Vn3 to drive a touch display and receive section components for outputting one touch signal Vo to perform operations at a touch sensitive device. However, it is to be understood that additional similar components can be used to generate and output more than two stimulation signals and one touch signal according to the needs of the touch display.

Though FIG. 7 illustrates the DAC generating a positive stimulation signal Vp that is later inverted to a negative stimulation signal Vn, it is to be understood that the DAC could alternatively generate a negative stimulation signal Vn that is later inverted to a positive stimulation signal Vp for noise reduction.

Figure 8:
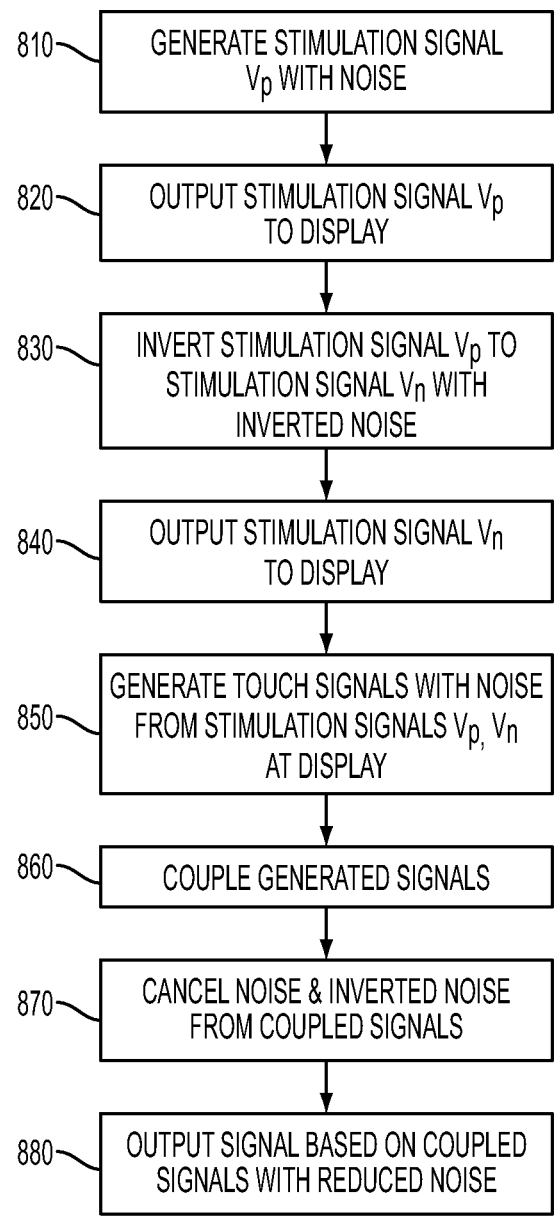
FIG. 8 illustrates an exemplary method of reducing noise in a touch controller, such as in FIG. 7, according to various embodiments.

FIG. 8 illustrates an exemplary method of reducing noise in a touch controller of a touch sensitive device according to various embodiments. This method can be applied to the touch controller of FIG. 7, for example. In the example of FIG. 8, a positive stimulation signal Vp with noise can be generated, for example, by a DAC (810). The noise can come from the component generating the stimulation signal and/or from downstream components processing the stimulation signal. In some embodiments, the noise can be correlated or common mode. The positive stimulation signal Vp can be outputted for driving generation of a touch signal, for example, by a touch display (820). The stimulation signal Vp can also be inverted to a negative stimulation signal Vn with inverted noise (830). The stimulation signal Vn can be outputted for driving generation of a touch signal, for example, by the touch display (840). The touch signals can be generated from the stimulation signals Vp, Vn, where the noise is passed to the generated signals (850). The touch signals can be coupled together for processing, for example, by a sense amplifier (860). Because one touch signal having inverted noise is coupled to another touch signal having non-inverted noise, the noise can cancel out (870). The resulting coupled signal can be outputted with substantially reduced noise (880).

Figure 9:
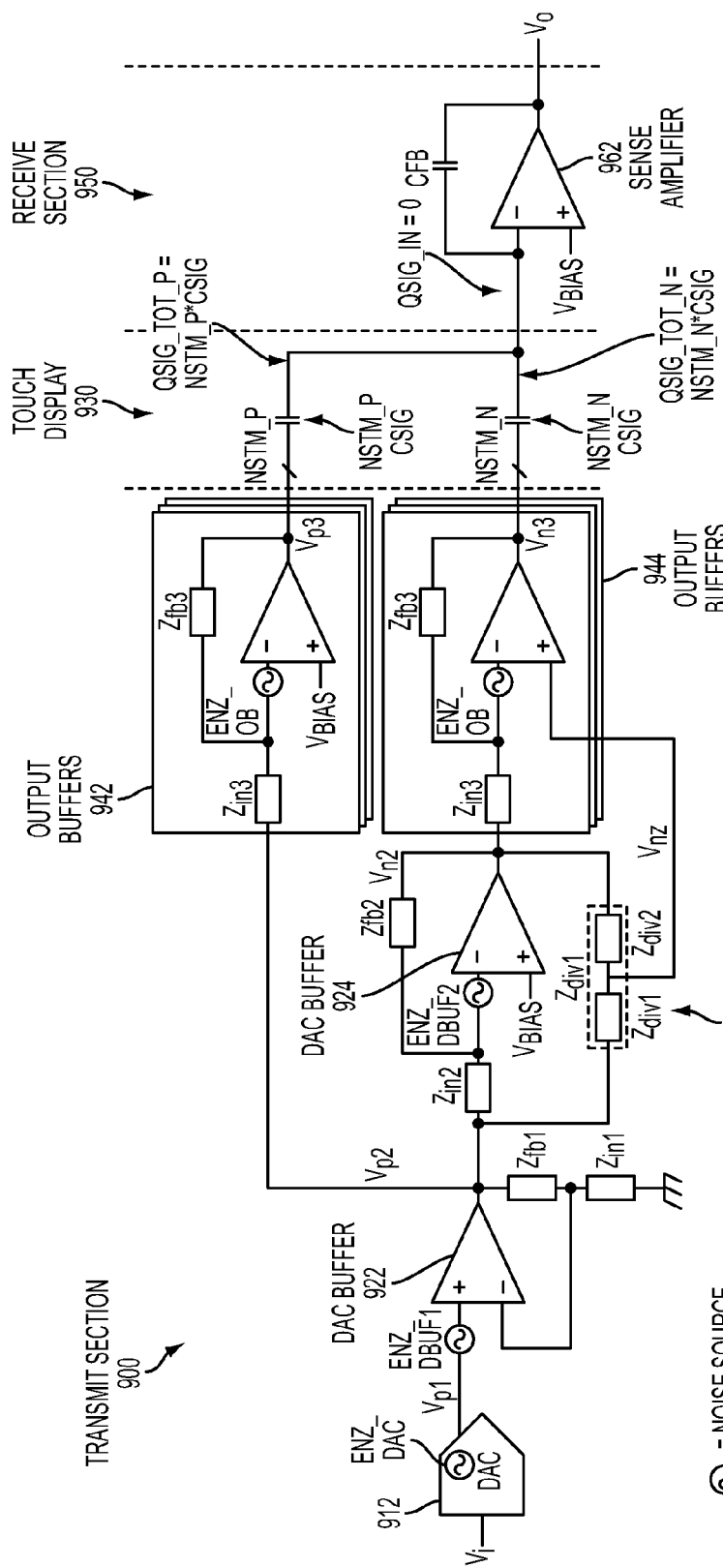
FIG. 9 illustrates another exemplary touch controller having transmit and receive sections with noise reduction circuitry according to various embodiments.

FIG. 9 illustrates another exemplary transmit section and receive section of a touch controller having noise reduction circuitry according to various embodiments. The receive section in FIG. 9 is the same as that in FIG. 7. The transmit section in FIG. 9 is similar to that in FIG. 7 with the addition of a voltage divider to isolate inverter-induced noise. In the example of FIG. 9, transmit section 900 can include DAC 912 for generating stimulation signals to drive the touch display 930. The DAC 912 can output a positive stimulation signal Vp1 having induced noise. The transmit section 900 can also include first DAC buffer 922 to receive the stimulation signal Vp1 from the DAC 912. The DAC buffer 922 can include feedback impedances Zin1 and Zfb1 and can have a gain of (1+Zfb1/Zin1). In some embodiments, the DAC buffer 922 can amplify the stimulation signal Vp1 to an effective level to drive the touch display and/or facilitate noise reduction. As a consequence of amplifying the stimulation signal Vp1, the induced noise in the stimulation signal can also be amplified. The first DAC buffer 922 can also induce additional noise into the stimulation signal Vp1 to form correlated noise or common mode noise in the stimulation signal Vp2 outputted from the buffer. The first DAC buffer 922 can output the stimulation signal Vp2 to first output buffer 942 and to second DAC buffer in the transmit section 900. The first output buffer 942 can include a input impedance Zin3 and feedback impedance Zfb3 and can have a gain.

The transmit section 900 can include second DAC buffer 924 which can be configured as an inverter. The DAC buffer 924 can include an input impedance Zin2 and a feedback impedance Zfb2. In some embodiments, the second DAC buffer 924 can amplify and invert the stimulation signal Vp2 to an effective level to drive the touch display and/or facilitate noise reduction. As a consequence of amplifying and inverting the stimulation signal Vp2, the induced noise in the stimulation signal can also be amplified. The gain (or amount of amplification) of the DAC buffers 922, 924 can be the same or different based on the touch display drive requirements and/or the noise reduction needs.

The transmit section 900 can also include voltage divider 932 to receive the positive stimulation signal Vp2 from the first DAC buffer 922 and the negative stimulation signal Vn2 from the second DAC buffer 924 and isolate the noise induced by the second DAC buffer. Because the stimulation signals Vp2, Vn2 with their DAC-induced noise are closely matched, they can cancel each other out, leaving the inverter-induced noise Vnz as an output from the voltage divider 932. The transmit section 900 can include second output buffer 944 to receive the negative stimulation signal Vn2 from the second DAC buffer 924 and the isolated noise Vnz from the voltage divider 932. The second output buffer 944 can include an input impedance Zin3 and a feedback impedance Zfb3. The second output buffer 944 can operate as a differential buffer to subtract the isolated inverter-induced noise Vnz from the stimulation signal Vn2, leaving the DAC-induced noise therein. The output buffers 942, 944 can output the respective stimulation signals Vp3, Vn3 with DAC-induced noise to the touch display 930.

Receive section 950 can include sense amplifier 962 for receiving and processing touch signals generated at the touch display 930. The sense amplifier 962 can include a feedback capacitor Cfb. The touch display 930 can be driven by the stimulation signals Vp3, Vn3 from the transmit section's output buffers 942, 944 to generate touch signals indicative of a touch or hover at the display. As described with respect to FIG. 7, here the touch signals can have inverted and non-inverted DAC-induced noise passed from their respective stimulation signals Vp3, Vn3. An array of NSTM_P output buffers 942 can couple into NSTM_P signal capacitors Csig in the touch display 930 generating signal charge NSTM_P*Csig*Vp3 into the inverting input node of the sense amplifier 962, where NSTM_P=the number of output buffers 942 outputting a positive stimulation signal Vp3. Similarly, an array of NSTM_N output buffers 944 can couple into NSTM_N signal capacitors Csig in the display 930 generating signal charge NSTM_N*Csig*Vn3 into the inverting input node of the sense amplifier 962, where NSTM_N=the number of output buffers 944 outputting a negative stimulation signal Vn3. Since Vp3=−Vn3, the effective charge Qsig_in into the sense amplifier 962 can be zero, in the absence of a touch or hover at the display 930, and can be non-zero if one of the Csig capacitors in the display is modulated by Csig_sns, i.e., a change in sense capacitance due to a touch or hover at the display. When the touch signals are coupled together as input to the sense amplifier 962, the DAC-induced noise can cancel out as described previously. The sense amplifier 962 can then output touch signal Vo with substantially reduced noise for touch and hover sensing.

Here, as in FIG. 7, the DAC-induced noise can be canceled out. Additionally, the second DAC buffer-induced noise (as illustrated in Equation (17)) can also be substantially reduced or eliminated using the voltage divider 932 as described previously. In an example, the voltage divider 932 having impedances Zdiv1 and Zdiv2 can isolate the noise component Vnz of the second DAC buffer 924. Suppose the second DAC buffer 924 has an input referred noise density ENZ_DBUF2 and a gain G_DBUF2=Zfb2/Zin2=−1. The output noise density of the second DAC buffer 924 can be the product of the non-inverting gain of the buffer and the input referred noise. That is, $$\text{ENZ\_Vn2} = \text{ENZ\_DBUF2} * \left(1 + \frac{Zfb2}{Zin2}\right) = 2 * \text{ENZ\_DBUF2}, \quad (18)$$

where ENZ_Vn2=the output noise density at the second DAC buffer 924, Zfb2=the feedback impedance of the second DAC buffer, and Zin2=the input impedance of the second DAC buffer. The stimulation signal Vn3 can see the inverted output noise density as follows.

$$\text{ENZ\_Vn3\_N} = -2 * \text{ENZ\_DBUF2}, \quad (19)$$

where ENZ_Vn3_N=the inverted output noise density at the second output buffer 944.

The voltage divider 932 can cancel out the signal components of the stimulation signals Vp2, Vn2, but isolate half of the second DAC buffer output voltage noise density ENZ_Vn2 because the impedances Zdiv1=Zdiv2. In other words, the center tap of the voltage divider 924 can have a noise component ENZ_DBUF2, which can be passed on to the non-inverting input of the second output buffer 944 and gained up by the non-inverting noise gain of the output buffer. Assuming that the gain of the second output buffer 944 is −1, i.e., the second output buffer impedances Zfb3=Zin3, the non-inverting noise gain of the second output buffer can be as follows.

$$G\_OB\_NI = 1 + \frac{Zfb3}{Zin3} = 2, \quad (20)$$

where G_OB_NI=the non-inverting noise gain of the second output buffer 944.

The output noise density due to the isolated noise density component from the voltage divider 932 can be as follow.

$$\text{ENZ\_Vn3\_P} = G\_OB\_NI * \text{ENZ\_DBUF2} = 2 * \text{ENZ\_DBUF2}, \quad (21)$$

where ENZ_Vn3_P=the output noise density from the voltage divider 932 at the second output buffer 944.

Accordingly, the total voltage noise density at the output of the second output buffer 944 due to the noise introduced by the second DAC buffer 924 can be canceled at the output buffer because the non-inverting input to the output buffer can be the inverted output noise density ENZ_Vn3_N, as in Equation (19), and the inverting input to the output buffer can be the output noise density ENZ_Vn3_P, as in Equation (21), such that when combined in the output buffer, ENZ_Vn3_N+ENZ_Vn3_P=0.

The example of FIG. 9 illustrates transmit section components for outputting two stimulation signals Vp3, Vn3 to drive a touch display and receive section components for outputting one touch signal Vo to perform operations at a touch sensitive device. However, it is to be understood that additional similar components can be used to generate and output more than two stimulation signals and one touch signal according to the needs of the touch display.

Though FIG. 9 illustrates the DAC generating a positive stimulation signal Vp that is later inverted to a negative stimulation signal Vn from which noise is isolated, it is to be understood that the DAC could alternatively generate a negative stimulation signal Vn that is later inverted to a positive stimulation signal Vp from which the noise is isolated for noise reduction.

Figure 10:
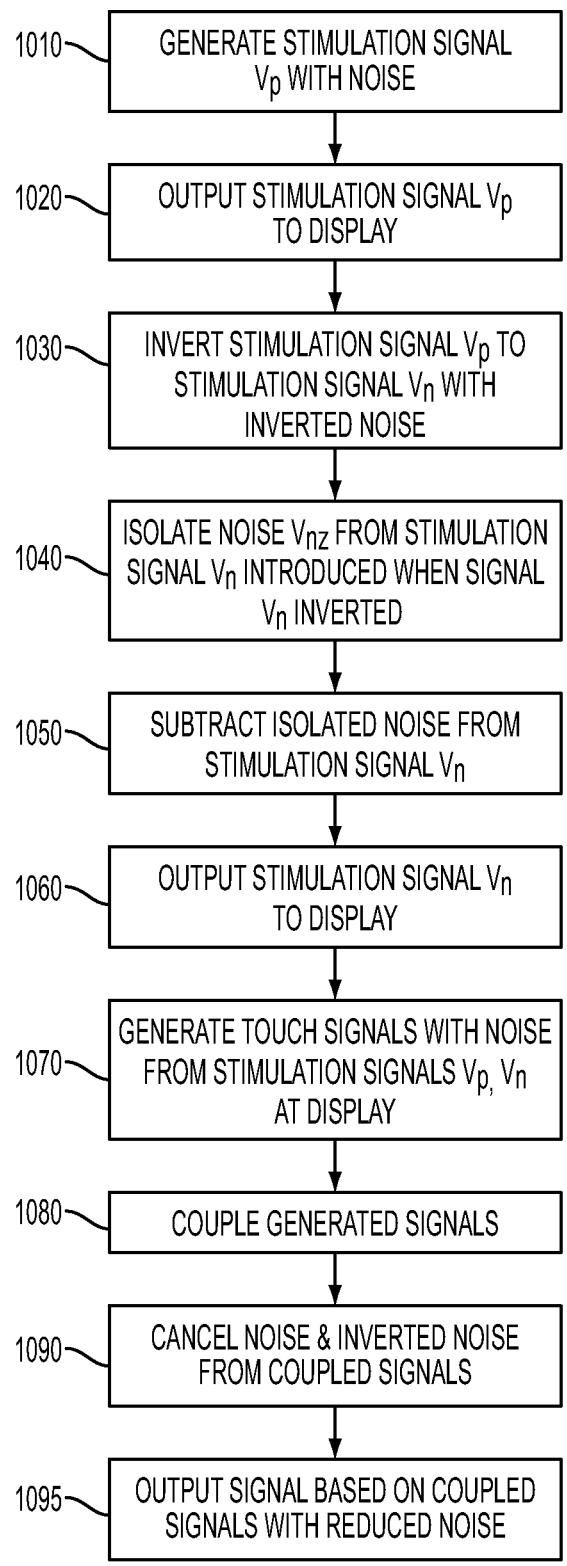
FIG. 10 illustrates an exemplary method of reducing noise in a touch controller, such as in FIG. 9, according to various embodiments.

FIG. 10 illustrates another exemplary method of reducing noise in a touch controller of a touch sensitive device according to various embodiments. This method can be applied to the touch controller of FIG. 9, for example. In the example of FIG. 10, a positive stimulation signal Vp with noise can be generated, for example, by a DAC (1010). The noise can come from the component generating the stimulation signal and/or from downstream components processing the stimulation signal. In some embodiments, the noise can be correlated or common mode. The positive stimulation signal Vp can be outputted for driving generation of a touch signal, for example, by a touch display (1020). The stimulation signal Vp can also be inverted to a negative stimulation signal Vn with inverted noise (1030). Additional noise that was introduced into the negative stimulation signal Vn when inverted can be isolated from the signal. (1040). The isolated noise can then be subtracted from the stimulation signal Vn, for example, by a differential output buffer (1050). The stimulation signal Vn can be outputted for driving generation of a touch signal, for example, by the touch display (1060). The touch signals can be generated from the stimulation signals Vp, Vn, where the noise and inverted noise is passed to the generated signals (1070). The touch signals can be coupled together for processing, for example, by a sense amplifier (1080). Because one touch signal having inverted noise is coupled to another touch signal having non-inverted noise, the noise can cancel out (1090). The resulting coupled signal can be outputted with substantially reduced noise (1095).

Figure 11:
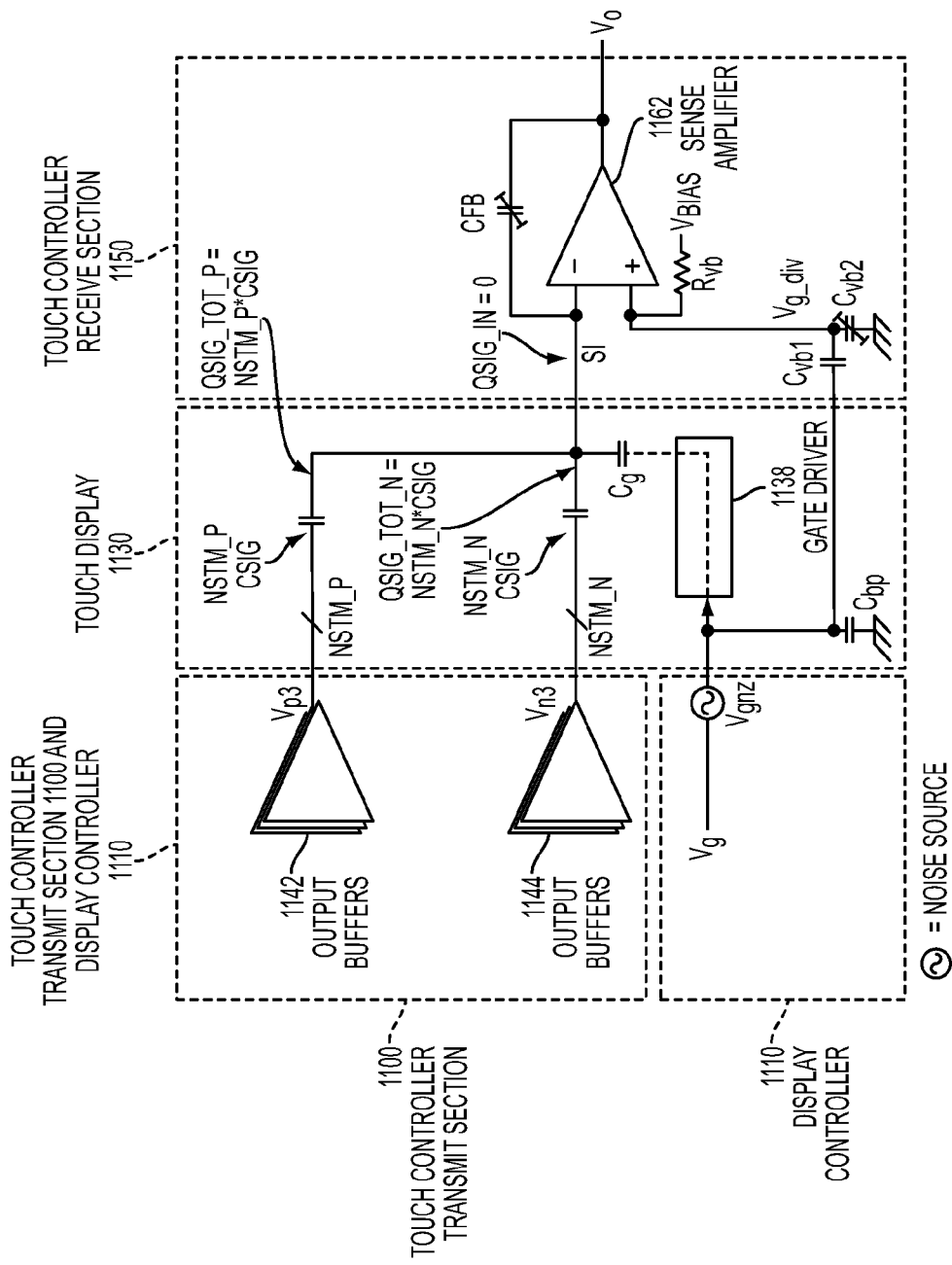
FIG. 11 illustrates an exemplary touch controller having a receive section with noise reduction circuitry according to various embodiments.

FIG. 11 illustrates an exemplary receive section of a touch controller having noise reduction circuitry according to various embodiments. In the example of FIG. 11, receive section 1150 can include sense amplifier 1162 for receiving and processing touch signals from touch display 1130. The sense amplifier 1162 can have a feedback capacitor Cfb. As described previously, the touch display 1130 can be driven with stimulation signals Vp3, Vn3 from respective output buffers 1142, 1144 of touch controller transmit section 1100 to generate the respective touch signals Csig,p, Csig,n. An array of NSTM_P output buffers 1142 can couple into NSTM_P signal capacitors Csig in the touch display 1130 generating signal charge NSTM_P*Csig*Vp3, where NSTM_P=the number of output buffers 1142 outputting a positive stimulation signal Vp3. Similarly, an array of NSTM_N output buffers 1144 can couple into NSTM_N signal capacitors Csig in the display 1130 generating signal charge NSTM_N*Csig*Vn3, where NSTM_N=the number of output buffers 1144 outputting a negative stimulation signal Vn3. The signals can couple for effective chart Qsig_tot_n=NSTM_N*Csig into the inverting input node of the sense amplifier 1162. Since Vp3=−Vn3, the effective charge Qsig_in into the sense amplifier 1162 can be zero, in the absence of a touch or hover at the display 1130, and can be non-zero if one of the Csig capacitors in the display is modulated by Csig_sns, i.e., a change in sense capacitance due to a touch or hover at the display.

Gate driver 1138 of the touch display 1138 can powered by gate signal Vg from display controller 1110 which can form a parasitic capacitance Cg with the inverting input of the sense amplifier 1162, thereby introducing noise Vgnz into the inverting input of the sense amplifier. The resulting output noise from the sense amplifier 1162 can be as follows.

$$Vgnz\_sao\_n = G\_SA\_NI * Vgnz, \quad (22)$$

where Vgnz_sao_n=the output noise from the sense amplifier 1162, and G_SA_NI=the inverting gain (−Cg/Cfb) of the sense amplifier.

To reduce the output noise, the sense amplifier 1162 can operate as a differential amplifier to subtract an input based on the gate signal Vg from the touch signal input. For this, the gate signal Vg can be AC coupled into the non-inverting input of the sense amplifier 1162 via capacitor Cvb1 relative to Vbias. The cut-off frequency of the high pass filter formed by capacitors Cvb1, Cvb2 and resistor Rvb can be chosen well below the lowest stimulus frequency (for example, ten times lower) to prevent attenuation of the noise Vgnz in the stimulus frequency range. Tunable capacitor Cvb2 can form a capacitive divider with capacitor Cvb1 and can be used to adjust the noise level Vg_div to be applied to the non-inverting input of the sense amplifier 1162. The ratio between the capacitors Cvb1 and Cvb2 can be adjusted so as to accomplish optimum noise cancellation and/or reduction at the output of the sense amplifier 1162.

The noise Vgnz induced into the non-inverting input of the sense amplifier 1162 can be gained up by the non-inverting noise gain of the sense amplifier as follows.

$$Vgnz\_sao\_p = Vgnz * \alpha * \left(1 + \frac{Csi}{Cfb}\right), \quad (23)$$

where Vgnz_sao_p=the noise at the non-inverting input of the sense amplifier 1162, α=a noise scale factor adjustable by capacitor Cvb2, Csi=the total stray capacitance (not shown) at the input of the sense amplifier, and Cfb=the feedback capacitor of the sense amplifier.

In order to cancel Vgnz, the noise at the non-inverting input, Vgnz_sao_p, of the sense amplifier 1162 and the noise at the inverting input, Vgnz_sao_n, can be the same, such that Vgnz_sao_p+Vgnz_sao_n=0. Substituting this condition into Equation (23) can result in the following.

$$-Vgnz * \left(\frac{Cg}{Cfb}\right) + Vgnz * \alpha * \left(1 + \frac{Csi}{Cfb}\right) = 0. \quad (24)$$

After further simplification and re-arrangement of Equation (24), the optimum noise scale factor for which the Vgnz noise component can be canceled can be found as follows.

$$\alpha = \frac{Cg}{Cfb + Csi}. \quad (25)$$

Accordingly, the tunable capacitor Cvb2 can be adjusted until the optimum noise scale factor is reached, thereby allowing the sense amplifier 1162 to cancel out the induced noise Vgnz. The sense amplifier 1162 can then output touch signal Vo with substantially reduced noise for touch and hover sensing.

The example of FIG. 11 illustrates receive section components for outputting one touch signal to perform operations at a touch sensitive device. However, it is to be understood that additional similar components can be used to generate and output more than one touch signal according to the needs of the touch display.

Figure 12:
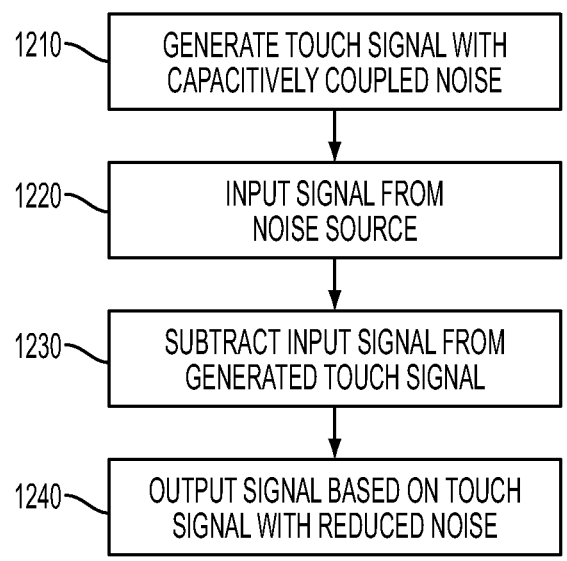
FIG. 12 illustrates an exemplary method of reducing noise in a touch controller, such as in FIG. 11, according to various embodiments.

FIG. 12 illustrates an exemplary method of reducing noise in a touch controller of a touch sensitive device according to various embodiments. This method can be applied to the touch controller of FIG. 11, for example. In the example of FIG. 12, a touch signal can be generated, for example, by a touch display (1210). Noise can be introduced into the touch signal at a component, for example, a sense amplifier, that receives the touch signal for processing. The noise can come from a power supply to the touch display, for example. A signal from the touch signal noise source can also be inputted to the component to operate the component as a differential circuit (1220). The noise signal can be subtracted from the touch signal (1230). The resulting touch signal can be outputted with substantially reduced noise (1240).

Prior to or during operation of the touch sensitive device, device components, e.g., tunable capacitors, can be adjusted to an optimum noise scale factor at which the sense amplifier can optimally subtract out the noise from the touch signal as described above.

Figure 13:
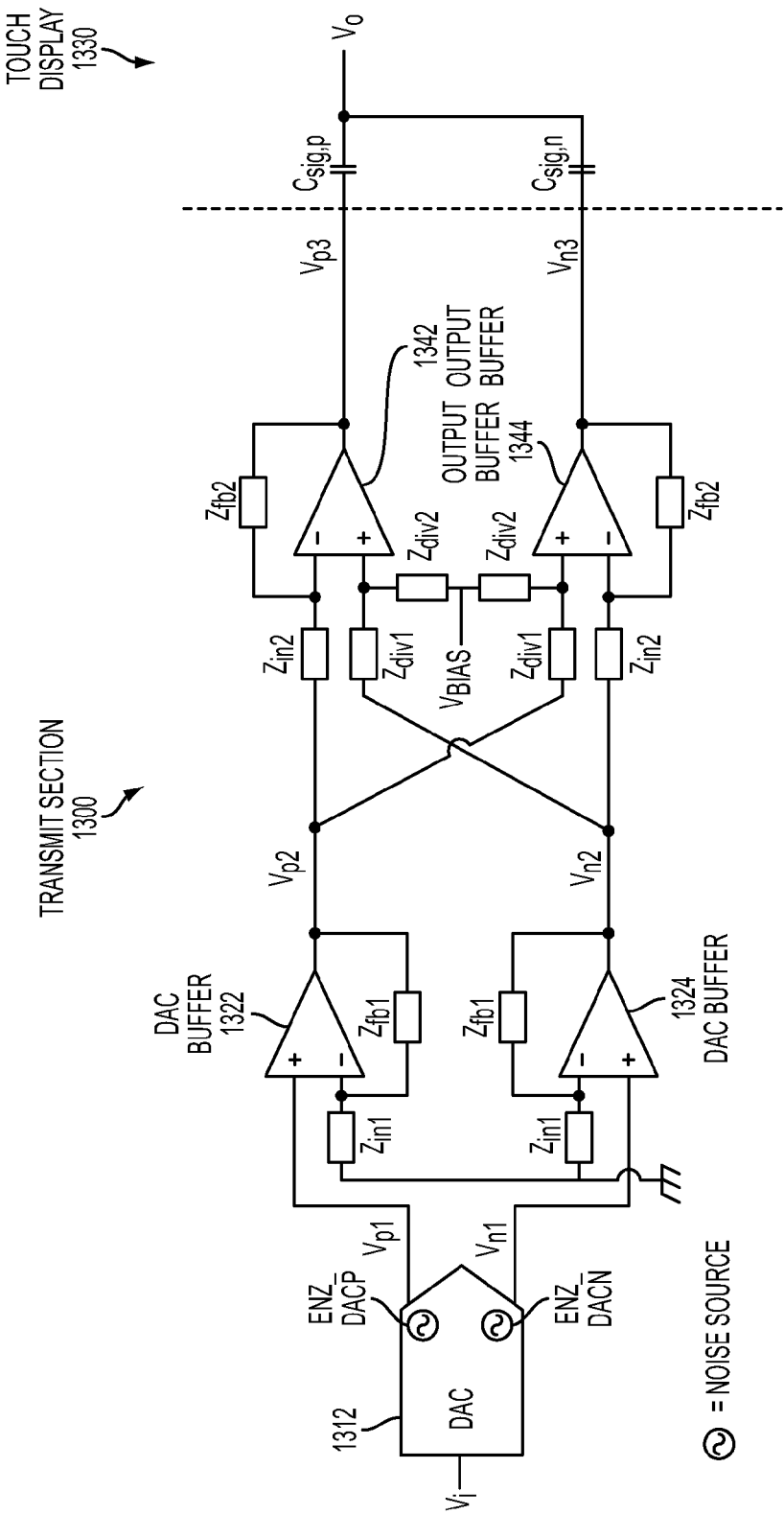
FIG. 13 illustrates another exemplary touch controller having a transmit section with noise reduction circuitry according to various embodiments.

FIG. 13 illustrates an exemplary transmit section of a touch controller having noise reduction circuitry according to various embodiments. In the example of FIG. 13, transmit section 1300 can generate stimulation signals for driving touch display 1330. The transmit section 1300 can include digital-to-analog converter (DAC) 1312 for generating stimulation signals to drive the touch display 1330. The DAC 1312 can output a positive stimulation signal Vp1 and a negative stimulation signal Vn1, each signal having induced noise. The transmit section 1300 can also include DAC buffers 1322, 1324 to receive the respective stimulation signals Vp1, Vn1 (or Ip1, In1 in a current mode DAC) from the DAC 1312. The DAC buffers 1322, 1324 can have feedback impedances Zfb1 and Zin1. In some embodiments, the DAC buffers 1322, 1324 can amplify the stimulation signals Vp1, Vn1 to an effective level to drive the touch display. As a consequence, the induced noise in the stimulation signals Vp1, Vn1 can also be amplified.

The transmit section 1300 can also include output buffers 1342, 1344 to receive the respective stimulation signals Vp2, Vn2 from the DAC buffers 1322, 1324 as one input and the other respective stimulation signals Vn2, Vp2 from the buffers as the other input. For example, the output buffer 1342 can receive the positive stimulation signal Vp2 from the DAC buffer 1322 as one input and the negative stimulation signal Vn2 from the DAC buffer 1324 as the other input. Similarly, the output buffer 1344 can receive the negative stimulation signal Vn2 from the DAC buffer 1324 as one input and the positive stimulation signal Vp2 from the DAC buffer 1322 as the other input. The output buffers 1342, 1344 can have input impedances Zin2 and feedback impedances Zfb2. The output buffers 1342, 1344 can convert noise inputted with the stimulation signals Vp2, Vn2 into differential noise. In some embodiments, the noise to be converted can be correlated or common mode noise. In some embodiments, the noise to be converted can also include other types of noise. The stimulation signals Vn2, Vp2 in the other input can be coupled to a bias voltage Vbias into the DAC buffers 1322, 1324 through voltage dividers Zdiv1 and Zdiv2. The output buffers 1342, 1344 can then output the respective stimulation signals Vp3, Vn3 with the differential noise to the touch display 1330 to generate touch signals, Csig,p, Csig,n. The generated touch signals can be coupled together to cancel out the differential noise, resulting in touch signals with substantially reduced noise.

In an example, the stimulation signal Vp1 can have a voltage noise density ENZ_DACP and the stimulation signal Vp2 can have a voltage noise density ENZ_DACN. For simplicity, in this example, it is assumed that the various passive feedback and input impedances Zin1, Zin2, Zdiv1, Zdiv2, Zfb1, Zfb2, and bias reference Vbias are noise free or have negligible noise. The voltage noise density at DAC buffer 1322 can be as follows.

$$ENZ\_Vp2 = G\_DBUF * ENZ\_DACP, \quad (26)$$

where ENZ_Vp2=the voltage noise density of the stimulation signal Vp2, G_DBUF=the gain of the DAC buffer 1322, and ENZ_DACP=the voltage noise density contributed by the DAC 1312 in the stimulation signal Vp1. Similarly, the voltage noise density at DAC buffer 1324 can be as follows.

$$ENZ\_Vn2 = G\_DBUF * ENZ\_DACN, \quad (27)$$

where ENZ_Vn2=the voltage noise density of the stimulation signal Vn2, G_DBUF=the gain of the DAC buffer 1324, and ENZ_DACN=the voltage noise density contributed by the DAC 1312 in the stimulation signal Vn1.

Assuming Zfb2/Zin2=Zdiv2/Zdiv1, the voltage at the output of the output buffer 1342 can be as follows.

$$Vp3 = (Vn2 - Vp2) * \left(\frac{Zfb2}{Zin2}\right), \quad (28)$$

where Vp3=the positive stimulation signal output from the output buffer 1342, Vn2=the negative stimulation signal output from the DAC buffer 1324, Vp2=the positive stimulation signal output from the DAC buffer 1322, Zfb2=the feedback impedance of the output buffers 1342, 1344, and Zin2=the input impedance of the output buffers. Similarly, the voltage at the output of the output buffer 1344 can be as follows.

$$Vn3 = (Vp2 - Vn2) * \left(\frac{Zfb2}{Zin2}\right), \quad (29)$$

where Vn3=the negative stimulation signal output from the output buffer 1344.

The resulting voltage noise density at the output of the output buffer 1342 can be as follows.

$$ENZ\_Vp3 = G\_DBUF * (ENZ\_DACN - ENZ\_DACP) * \left(\frac{Zfb2}{Zin2}\right), \quad (30)$$

where ENZ_Vp3=the voltage noise density of the stimulation signal Vp3 outputted by the output buffer 1342, G_DBUF=the gain of the DAC buffer 1322, ENZ_DACP=the voltage noise density contributed by the DAC 1312 in the stimulation signal Vp1, ENZ_DACN=the voltage noise density contributed by the DAC 1312 in the stimulation signal Vn1, Zfb2=the feedback impedance of the output buffer 1342, and Zin2=the input impedance of the output buffer 1342. Similarly, the resulting voltage noise density at the output of the output buffer 1344 can be as follows.

$$ENZ\_Vn3 = G\_DBUF * (ENZ\_DACP - ENZ\_DACN) * \left(\frac{Zfb2}{Zin2}\right), \quad (31)$$

where ENZ_Vn3=the voltage noise density of the stimulation signal Vn3 outputted by the output buffer 1344, G_DBUF=the gain of the DAC buffer 1324, Zfb2=the feedback impedance of the output buffer 1344, and Zin2=the input impedance of the output buffer 1344.

For the case where equal numbers of positive and negative stimulation signals Vp3, Vn3 drive the touch display 1330 to generate touch signals, Csig,p, Csig,n, the noise can be canceled out when the touch signals are coupled as follows.

$$ENZ\_TOT = G\_DBUF * \quad (32)$$
$$(ENZ\_DACP - ENZ\_DACN, ENZ\_DACN - ENZ\_DACP) *$$
$$\left(\frac{Zfb2}{Zin2}\right) = G\_DBUF * (0, 0) * \left(\frac{Zfb2}{Zin2}\right) = 0,$$

where ENZ_TOT=the voltage noise density in the coupled touch signals at the touch display 1330.

The example of FIG. 13 illustrates transmit section components for outputting two stimulation signals to drive a touch display. However, it is to be understood that additional similar components can be used to generate and output more than two stimulation signals according to the needs of the touch display.

Figure 14:
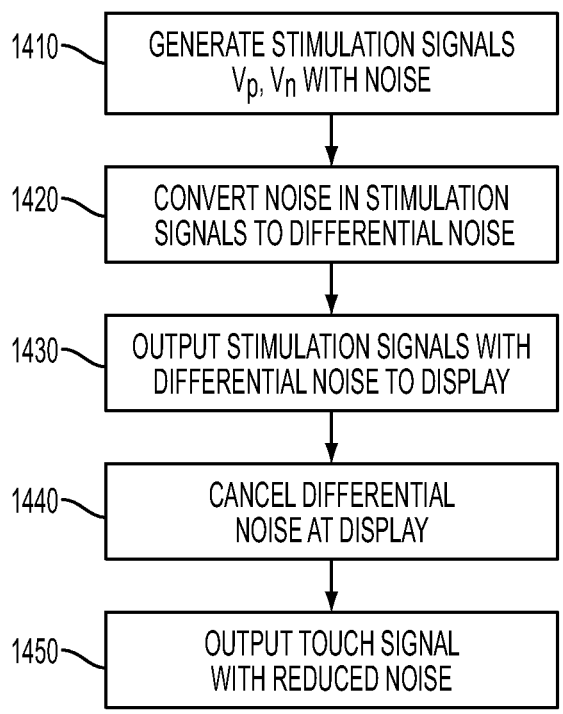
FIG. 14 illustrates an exemplary method of reducing noise in a touch controller, such as in FIG. 13, according to various embodiments.

FIG. 14 illustrates an exemplary method of reducing noise in a touch controller of a touch sensitive device according to various embodiments. This method can be applied to the touch controller of FIG. 13, for example. In the example of FIG. 14, a positive stimulation signal Vp1 and a negative stimulation signal Vn1 with noise can be generated, for example, by a DAC (1410). The noise can come from the component generating the stimulation signals and/or from downstream components processing the stimulation signals. In some embodiments, the noise can be correlated or common mode. The noise can be converted to differential noise, for example, by output buffers (1420). The resulting stimulation signals Vp3, Vn3 can be outputted with differential noise to a touch display for generating touch signals indicative of a touch or hover at the display (1430). The touch signals can be coupled together, thereby canceling out the differential noise (1440). The resulting touch signal output Vo can be outputted with substantially reduced noise (1450).

In additional to correlated or common mode noise introduced into the stimulation signals Vp, Vn, noise can be introduced in the bias voltage Vbias. The noise in the bias voltage Vbias can be canceled out by measuring the output Vo with respect to the bias voltage source.

Figure 15:
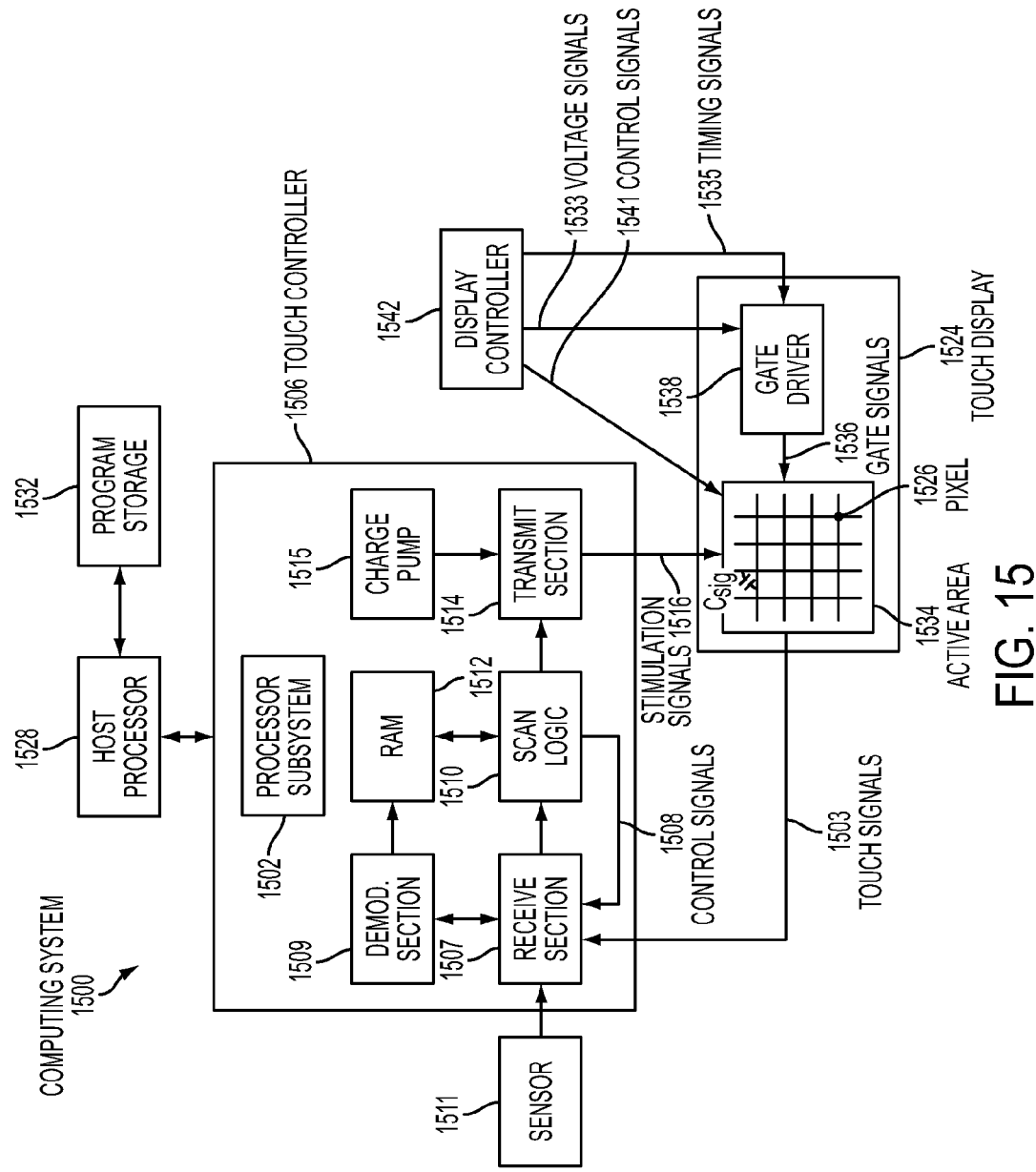
FIG. 15 illustrates an exemplary computing system having a touch controller with noise reduction circuitry according to various embodiments.

FIG. 15 illustrates an exemplary computing system that can include a touch controller having noise reduction circuitry according to various embodiments. In the example of FIG. 15, computing system 1500 can include touch controller 1506. The touch controller 1506 can be a single application specific integrated circuit (ASIC) that can include one or more processor subsystems 1502, which can include one or more main processors, such as ARM968 processors or other processors with similar functionality and capabilities. However, in other embodiments, the processor functionality can be implemented instead by dedicated logic, such as a state machine. The processor subsystems 1502 can also include peripherals (not shown) such as random access memory (RAM) or other types of memory or storage, watchdog timers and the like. The touch controller 1506 can also include receive section 1507 for receiving signals, such as touch signals 1503 of one or more sense channels (not shown), other signals from other sensors such as sensor 1511, etc. The touch controller 1506 can also include demodulation section 1509 such as a multistage vector demodulation engine, display scan logic 1510, and transmit section 1514 for transmitting stimulation signals 1516 to touch display 1524 to drive the display. The scan logic 1510 can access RAM 1512, autonomously read data from the sense channels, and provide control for the sense channels. In addition, the scan logic 1510 can control the transmit section 1514 to generate the stimulation signals 1516 at various frequencies and phases that can be selectively applied to rows of the touch display 1524.

The touch controller 1506 can also include charge pump 1515, which can be used to generate the supply voltage for the transmit section 1514. The stimulation signals 1516 can have amplitudes higher than the maximum voltage by cascading two charge store devices, e.g., capacitors, together to form the charge pump 1515. Therefore, the stimulus voltage can be higher (e.g., 6V) than the voltage level a single capacitor can handle (e.g., 3.6V). Although FIG. 15 shows the charge pump 1515 separate from the transmit section 1514, the charge pump can be part of the transmit section.

Computing system 1500 can include display controller 1542. The display controller 1542 can be a single application specific integrated circuit (ASIC) that can include one or more processor subsystems (not shown), which can include one or more main processors, such as ARM968 processors or other processors with similar functionality and capabilities. However, in other embodiments, the processor functionality can be implemented instead by dedicated logic, such as a state machine. The processor subsystems can also include peripherals such as random access memory (RAM) or other types of memory or storage, watchdog timers and the like. The display controller 1542 can control the touch display 1524 during the display mode. The display controller 142 can supply voltage signals 1533 and timing signals 1535 to the gate driver 1538 to cause the gate driver to drive the touch display 1524 via the gate signals 1536 during the display mode and to remain static during the touch mode. The display controller 1542 can also transmit pixel control signals 1541 via source drivers (not shown) to the active area 1534 to facilitate the displaying of data at the touch display 1524.

Computing system 1500 can include host processor 1528 for receiving outputs from the processor subsystems 1502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1528 can also perform additional functions that may not be related to touch processing.

Touch display 1524 can include active area 1534 having touch sensing circuitry that can include a capacitive sensing medium having drive lines and sense lines. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines can be driven by stimulation signals 1516 and resulting touch signals 1503 generated in sense lines can be transmitted to receive section 1507 in touch controller 1506. In this way, drive lines and sense lines can be part of the touch sensing circuitry that can interact to form capacitive sensing nodes, which can be thought of as touch picture elements (touch pixels), such as touch pixels 1526. This way of understanding can be particularly useful when touch display 1524 can be viewed as capturing an "image" of touch. In other words, after touch controller 1506 has determined whether a touch has been detected at each touch pixel in the touch display, the pattern of touch pixels in the touch display at which a touch occurred can be thought of as an "image" of touch (e.g. a pattern of fingers touching the touch display).

The touch display 1524 can also include gate driver 1538, which can receive the voltage signals 1533 and the timing signals 1535 and generate gate signals 1536 for driving the active area 1534 of the touch display 1524 to display data during the display mode and to sense a touch or hover during the touch mode.

Note that one or more of the functions described above, can be performed, for example, by firmware stored in memory (e.g., one of the peripherals) and executed by the processor subsystem 1502, or stored in the program storage 1532 and executed by the host processor 1528. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch display, as described in FIG. 15, can sense touch and hover according to various embodiments. In addition, the touch display described herein can be either single- or multi-touch and hover.

Figure 16:
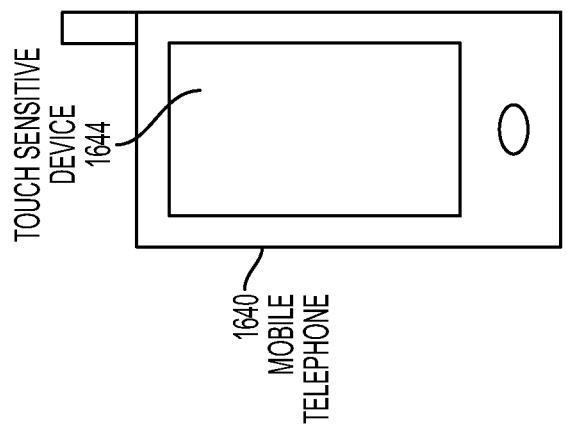
FIG. 16 illustrates an exemplary mobile telephone having a touch sensitive device with noise reduction circuitry according to various embodiments.

FIG. 16 illustrates an exemplary mobile telephone 1640 that can include touch sensitive device 1644 and other computing system blocks that can include a touch controller with noise reduction circuitry according to various embodiments.

Figure 17:
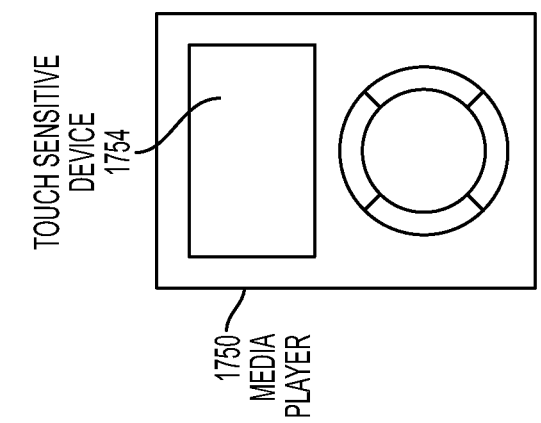
FIG. 17 illustrates an exemplary digital media player having a touch sensitive device with noise reduction circuitry according to various embodiments.

FIG. 17 illustrates an exemplary digital media player 1750 that can include touch sensitive device 1754 and other computing system blocks that can include a touch controller with noise reduction circuitry according to various embodiments.

Figure 18:
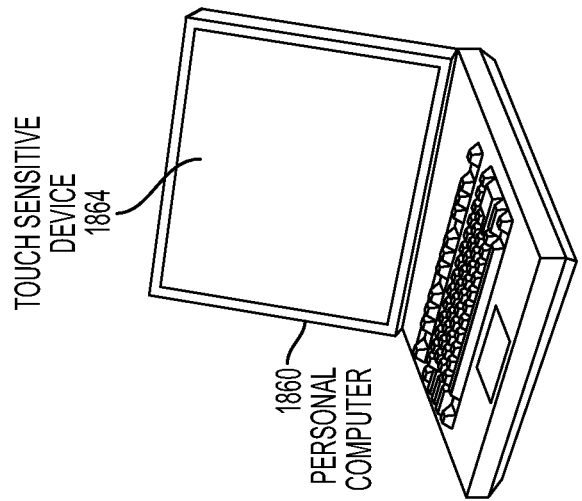
FIG. 18 illustrates an exemplary personal computer having a touch sensitive device with noise reduction circuitry according to various embodiments.

FIG. 18 illustrates an exemplary personal computer 1860 that can include touch sensitive device 1864 and other computing system blocks that can include a touch controller with noise reduction circuitry according to various embodiments.

The mobile telephone, media player, and personal computer of FIGS. 16 through 18 can have improved touch and hover sensing with a touch controller having noise reduction circuitry according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch controller comprising:
a transmit section configured to reduce noise, the transmit section including
a digital-to-analog converter (DAC) configured to output a first stimulation signal and a second stimulation signal, the stimulation signals including the noise, and
multiple output buffers, a first output buffer configured to convert the noise to first differential noise and output the first stimulation signal with the first differential noise to a touch sensor panel, and a second output buffer configured to convert the noise to second differential noise and output the second stimulation signal with the second differential noise to the touch sensor panel; and
a receive section configured to receive a touch signal generated from the first and second stimulation signals, the received touch signal having the first and second differential noise canceled therefrom.

2. The touch controller of claim 1, wherein the received touch signal comprises a first touch signal generated from the first stimulation signal with the first differential noise and a second touch signal generated from the second stimulation signal with the second differential noise, the first and second touch signals being coupled together to cancel out the first and second differential noise.

3. The touch controller of claim 1, wherein the first output buffer receives the first stimulation signal as a first input and the second stimulation signal as a second input so as to convert the noise in the first and second stimulation signals into the first differential noise, and the second output buffer receives the second stimulation signal as a first input and the first stimulation signal as a second input so as to convert the noise in the first and second stimulation signals into the second differential noise.

4. The touch controller of claim 3, wherein the first output buffer receives a bias voltage coupled with the second stimulation signal as the second input to the first output buffer, and the second output buffer receives a bias voltage coupled with the first stimulation signal as the second input to the second output buffer.

5. The touch controller of claim 4, wherein the bias voltage is coupled with the first stimulation signal through one or more voltage dividers.

6. The touch controller of claim 4, wherein the bias voltage is coupled with the second stimulation signal through one or more voltage dividers.

7. The touch controller of claim 4, wherein the bias voltage introduces a second noise into the first and second stimulation signals.

8. The touch controller of claim 7, wherein the second noise is canceled out by using the bias voltage as a reference.

9. The touch controller of claim 1, wherein the first and second stimulation signals have opposite phases, one having a positive phase and the other having a negative phase.

10. The touch controller of claim 1, wherein the converter induces the noise in the stimulation signals.

11. The touch controller of claim 1, wherein the noise comprises common mode noise.

12. The touch controller of claim 1, wherein the transmit section further comprises:
multiple DAC buffers, a first DAC buffer configured to transmit the first stimulation signal with the noise for generating a first touch signal and a second DAC buffer configured to transmit the second stimulation signal with the noise for generating a second touch signal.

13. A touch sensitive device comprising:
a touch sensor panel; and
a touch controller comprising:
a transmit section configured to reduce noise, the transmit section including
a digital-to-analog converter (DAC) configured to output a first stimulation signal and a second stimulation signal, the stimulation signals including the noise, and
multiple output buffers, a first output buffer configured to convert the noise to first differential noise and output the first stimulation signal with the first differential noise to the touch sensor panel, and a second output buffer configured to convert the noise to second differential noise and output the second stimulation signal with the second differential noise to the touch sensor panel; and
a receive section configured to receive a touch signal generated from the first and second stimulation signals, the received touch signal having the first and second differential noise canceled therefrom.

14. The touch sensitive device of claim 13, wherein the received touch signal comprises a first touch signal generated from the first stimulation signal with the first differential noise and a second touch signal generated from the second stimulation signal with the second differential noise, the first and second touch signals being coupled together to cancel out the first and second differential noise.

15. The touch sensitive device of claim 13, wherein the first output buffer receives the first stimulation signal as a first input and the second stimulation signal as a second input so as to convert the noise in the first and second stimulation signals into the first differential noise, and the second output buffer receives the second stimulation signal as a first input and the first stimulation signal as a second input so as to convert the noise in the first and second stimulation signals into the second differential noise.

16. The touch sensitive device of claim 15, wherein the first output buffer receives a bias voltage coupled with the second stimulation signal as the second input to the first output buffer, and the second output buffer receives a bias voltage coupled with the first stimulation signal as the second input to the second output buffer.

17. The touch sensitive device of claim 16, wherein the bias voltage is coupled with the first stimulation signal through one or more voltage dividers.

18. The touch sensitive device of claim 16, wherein the bias voltage is coupled with the second stimulation signal through one or more voltage dividers.

19. The touch sensitive device of claim 16, wherein the bias voltage introduces a second noise into the first and second stimulation signals.

20. The touch sensitive device of claim 19, wherein the second noise is canceled out by using the bias voltage as a reference.

21. The touch sensitive device of claim 13, wherein the first and second stimulation signals have opposite phases, one having a positive phase and the other having a negative phase.

22. The touch sensitive device of claim 13, wherein the converter induces the noise in the stimulation signals.

23. The touch sensitive device of claim 13, wherein the noise comprises common mode noise.

24. The touch sensitive device of claim 13, wherein the transmit section further comprises:
multiple DAC buffers, a first DAC buffer configured to transmit the first stimulation signal with the noise for generating a first touch signal and a second DAC buffer configured to transmit the second stimulation signal with the noise for generating a second touch signal.

* * * * *